(12) United States Patent
Major

(10) Patent No.: US 10,687,099 B2
(45) Date of Patent: Jun. 16, 2020

(54) METHODS AND SYSTEMS FOR ASSISTED CONTENT DELIVERY

(71) Applicant: ECHOSTAR TECHNOLOGIES L.L.C., Englewood, CO (US)

(72) Inventor: Robert Drew Major, Orem, UT (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/392,223

(22) Filed: Dec. 28, 2016

(65) Prior Publication Data

US 2017/0188065 A1 Jun. 29, 2017

Related U.S. Application Data

(60) Provisional application No. 62/272,438, filed on Dec. 29, 2015.

(51) Int. Cl.
*H04N 21/24* (2011.01)
*H04N 21/2187* (2011.01)
(Continued)

(52) U.S. Cl.
CPC .......... *H04N 21/2402* (2013.01); *H04B 1/16* (2013.01); *H04L 25/03184* (2013.01);
(Continued)

(58) Field of Classification Search
CPC .......... H04N 21/4383; H04N 21/4384; H04N 21/4622; H04N 21/2187; H04N 21/44004;
(Continued)

(56) References Cited

U.S. PATENT DOCUMENTS

| 4,535,355 A | 8/1985 | Arn et al. |
| 5,935,206 A | 8/1999 | Dixon et al. |

(Continued)

FOREIGN PATENT DOCUMENTS

| JP | 2006237673 A | 9/2006 |
| JP | 2007096561 A | 4/2007 |

(Continued)

OTHER PUBLICATIONS

USPTO, Notice of Allowance and Fee(s) Due in U.S. Appl. No. 15/247,147 dated Jun. 5, 2017.

(Continued)

*Primary Examiner* — Mulugeta Mengesha
*Assistant Examiner* — Alazar Tilahun
(74) *Attorney, Agent, or Firm* — Lorenz & Kopf LLP

(57) ABSTRACT

Systems, devices, and methods for streaming media content over a network are provided. One exemplary method of assisted streaming of media content over a network involves detecting, by a media player at a client device coupled to the network, a first condition with respect to streaming the media content, and in response to the first condition, requesting, by the media player, a first portion of the media content from a first content delivery source on the network. After requesting the first portion of the media content, the method further comprises detecting, by the media player, a second condition with respect to streaming the media content, and in response to detecting the second condition, requesting, by the media player, a subsequent portion of the media content from a second content delivery source on the network. The first content delivery source transmits the media content using a modified transport layer protocol.

19 Claims, 13 Drawing Sheets

(51) Int. Cl.

| | | |
|---|---|---|
| *H04N 21/262* | (2011.01) | |
| *H04N 21/234* | (2011.01) | |
| *H04N 21/61* | (2011.01) | |
| *H04N 21/414* | (2011.01) | |
| *H04N 21/4147* | (2011.01) | |
| *H04L 29/06* | (2006.01) | |
| *H04N 21/438* | (2011.01) | |
| *H04N 21/44* | (2011.01) | |
| *H04N 21/442* | (2011.01) | |
| *H04N 21/658* | (2011.01) | |
| *H04N 21/845* | (2011.01) | |
| *H04L 29/08* | (2006.01) | |
| *H04L 12/26* | (2006.01) | |
| *H04N 21/231* | (2011.01) | |
| *H04N 21/2343* | (2011.01) | |
| *H04N 21/2747* | (2011.01) | |
| *H04N 21/433* | (2011.01) | |
| *H04N 21/462* | (2011.01) | |
| *H04N 21/482* | (2011.01) | |
| *H04N 21/643* | (2011.01) | |
| *H04N 21/647* | (2011.01) | |
| *H04B 1/16* | (2006.01) | |
| *H04L 25/03* | (2006.01) | |
| *H04N 21/2387* | (2011.01) | |
| *H04N 21/238* | (2011.01) | |
| *H04N 21/237* | (2011.01) | |
| *H04N 21/278* | (2011.01) | |

(52) U.S. Cl.
CPC ...... *H04L 43/0876* (2013.01); *H04L 43/0888* (2013.01); *H04L 65/4084* (2013.01); *H04L 65/80* (2013.01); *H04L 67/327* (2013.01); *H04N 21/2187* (2013.01); *H04N 21/237* (2013.01); *H04N 21/238* (2013.01); *H04N 21/2387* (2013.01); *H04N 21/23103* (2013.01); *H04N 21/23106* (2013.01); *H04N 21/23116* (2013.01); *H04N 21/23406* (2013.01); *H04N 21/23439* (2013.01); *H04N 21/26216* (2013.01); *H04N 21/26258* (2013.01); *H04N 21/278* (2013.01); *H04N 21/2747* (2013.01); *H04N 21/4147* (2013.01); *H04N 21/41407* (2013.01); *H04N 21/4334* (2013.01); *H04N 21/4383* (2013.01); *H04N 21/44004* (2013.01); *H04N 21/44209* (2013.01); *H04N 21/4621* (2013.01); *H04N 21/4622* (2013.01); *H04N 21/4825* (2013.01); *H04N 21/6106* (2013.01); *H04N 21/6131* (2013.01); *H04N 21/64322* (2013.01); *H04N 21/64707* (2013.01); *H04N 21/64723* (2013.01); *H04N 21/64738* (2013.01); *H04N 21/6581* (2013.01); *H04N 21/6582* (2013.01); *H04N 21/8456* (2013.01)

(58) Field of Classification Search
CPC ......... H04N 21/47202; H04N 21/6125; H04N 21/2402; H04N 21/6582; H04N 21/8456; H04N 21/44209; H04N 21/6581; H04N 21/23106; H04N 21/237; H04N 21/2387; H04N 21/6106; H04N 21/278; H04N 21/23103; H04N 21/238; H04N 21/26258; H04N 21/64738; H04N 21/6131; H04N 21/26216; H04N 21/41407; H04N 21/23406; H04N 21/4147; H04N 21/64723; H04N 21/64707; H04N 21/64322; H04N 21/4825; H04N 21/4621; H04N 21/4334; H04N 21/2747; H04N 21/23439; H04N 21/23116; H04L 67/327; H04L 65/4084; H04L 65/80; H04L 25/03184; H04L 43/0888; H04L 43/0876; H04B 1/16
See application file for complete search history.

(56) References Cited

U.S. PATENT DOCUMENTS

| | | |
|---|---|---|
| 5,953,506 A | 9/1999 | Kalra et al. |
| 6,195,680 B1 | 2/2001 | Goldszmidt et al. |
| 6,366,614 B1 | 4/2002 | Pian et al. |
| 6,490,627 B1 | 12/2002 | Kalra et al. |
| 6,529,963 B1 | 3/2003 | Fredin et al. |
| 6,574,591 B1 | 6/2003 | Kleiman et al. |
| 6,604,118 B2 | 8/2003 | Kleiman et al. |
| 6,801,786 B1 | 10/2004 | Korpela |
| 6,973,081 B1 | 12/2005 | Patel |
| 6,976,090 B2 | 12/2005 | Ben-Shaul et al. |
| 7,046,630 B2 | 5/2006 | Abe et al. |
| 7,206,872 B2 | 4/2007 | Chen |
| 7,240,100 B1 | 7/2007 | Wein et al. |
| 7,474,832 B2 | 1/2009 | Boston et al. |
| 7,523,181 B2 | 4/2009 | Swildens et al. |
| 7,584,495 B2 | 9/2009 | Hannuksela et al. |
| 7,603,022 B2 | 10/2009 | Putterman et al. |
| 7,620,390 B2 | 11/2009 | Vezza et al. |
| 7,624,412 B2 | 11/2009 | McEvilly et al. |
| 7,739,239 B1 | 6/2010 | Cormie et al. |
| 7,770,200 B2 | 8/2010 | Brooks et al. |
| 7,957,266 B2 | 6/2011 | Kodialam et al. |
| 8,181,206 B2 | 5/2012 | Hasek |
| 8,238,725 B2 | 8/2012 | Demas et al. |
| 8,532,171 B1 | 9/2013 | Narayanan et al. |
| 8,578,045 B2 * | 11/2013 | Bowra ............. H04L 29/06027 709/231 |
| 8,681,680 B2 | 3/2014 | Mao et al. |
| 8,776,151 B2 | 7/2014 | Major et al. |
| 8,787,975 B2 | 7/2014 | Kanojia et al. |
| 8,832,724 B2 | 9/2014 | Major et al. |
| 8,832,757 B2 | 9/2014 | Major et al. |
| 8,887,205 B1 | 11/2014 | Schecter |
| 8,924,581 B1 * | 12/2014 | Acharya ............... H04L 65/608 370/395.5 |
| 8,925,023 B2 | 12/2014 | Major et al. |
| 8,990,328 B1 | 3/2015 | Grigsby et al. |
| 9,049,484 B2 | 6/2015 | Major et al. |
| 9,071,484 B1 | 6/2015 | Truax |
| 9,071,873 B2 | 6/2015 | Major et al. |
| 9,100,700 B2 | 8/2015 | Major et al. |
| 9,432,701 B2 | 8/2016 | Major et al. |
| 2002/0046405 A1 | 4/2002 | Lahr |
| 2002/0053078 A1 | 5/2002 | Holtz et al. |
| 2002/0087797 A1 | 7/2002 | Adrangi |
| 2002/0124258 A1 | 9/2002 | Fritsch |
| 2002/0152318 A1 | 10/2002 | Menon et al. |
| 2003/0014684 A1 | 1/2003 | Kashyap |
| 2003/0018966 A1 | 1/2003 | Cook et al. |
| 2003/0058707 A1 | 3/2003 | Dilger et al. |
| 2003/0070167 A1 | 4/2003 | Holtz et al. |
| 2003/0151753 A1 | 8/2003 | Li et al. |
| 2003/0154239 A1 | 8/2003 | Davis et al. |
| 2003/0204519 A1 | 10/2003 | Sirivara et al. |
| 2003/0208767 A1 | 11/2003 | Williamson et al. |
| 2004/0003101 A1 | 1/2004 | Roth et al. |
| 2004/0003400 A1 | 1/2004 | Carney et al. |
| 2004/0083283 A1 | 4/2004 | Sundaram et al. |
| 2004/0103444 A1 | 5/2004 | Weinberg et al. |
| 2004/0163115 A1 | 8/2004 | Butzer |
| 2004/0210927 A1 | 10/2004 | Bahr et al. |
| 2005/0002337 A1 | 1/2005 | Wang et al. |
| 2005/0108414 A1 | 5/2005 | Taylor et al. |
| 2005/0120107 A1 | 6/2005 | Kagan et al. |
| 2005/0188051 A1 | 8/2005 | Sneh |
| 2005/0191033 A1 | 9/2005 | Ishido |
| 2005/0233694 A1 | 10/2005 | Enari et al. |
| 2005/0275752 A1 | 12/2005 | Li et al. |
| 2005/0289618 A1 | 12/2005 | Hardin |

(56) References Cited

U.S. PATENT DOCUMENTS

| | | |
|---|---|---|
| 2006/0020984 A1 | 1/2006 | Ban et al. |
| 2006/0053078 A1 | 3/2006 | Yamamoto et al. |
| 2006/0080718 A1 | 4/2006 | Gray et al. |
| 2006/0117090 A1 | 6/2006 | Schellingerhout et al. |
| 2006/0206246 A1 | 9/2006 | Walker |
| 2006/0287912 A1 | 12/2006 | Raghuvamshi |
| 2007/0036516 A1 | 2/2007 | Kahn et al. |
| 2007/0083667 A1 | 4/2007 | Cooper |
| 2007/0107019 A1 | 5/2007 | Romano et al. |
| 2007/0118857 A1 | 5/2007 | Chen et al. |
| 2007/0124245 A1 | 5/2007 | Sato et al. |
| 2007/0127377 A1 | 6/2007 | Brocke et al. |
| 2008/0005505 A1 | 1/2008 | Maegawa |
| 2008/0013919 A1 | 1/2008 | Boston et al. |
| 2008/0052393 A1* | 2/2008 | McNaughton ........ H04L 41/147 709/224 |
| 2008/0092168 A1 | 4/2008 | Logan et al. |
| 2008/0127284 A1 | 5/2008 | Kouniniotis |
| 2008/0151758 A1 | 6/2008 | Weinrib et al. |
| 2008/0201748 A1 | 8/2008 | Hasek et al. |
| 2008/0219151 A1 | 9/2008 | Ma et al. |
| 2008/0222235 A1 | 9/2008 | Hurst et al. |
| 2008/0306871 A1 | 12/2008 | Grannan |
| 2008/0310825 A1 | 12/2008 | Fang et al. |
| 2008/0320159 A1 | 12/2008 | Naimark et al. |
| 2009/0024736 A1 | 1/2009 | Langille et al. |
| 2009/0025027 A1 | 1/2009 | Craner |
| 2009/0074380 A1 | 3/2009 | Boston et al. |
| 2009/0080582 A1 | 3/2009 | Loeffler et al. |
| 2009/0080864 A1 | 3/2009 | Rajakarunanayake |
| 2009/0100457 A1 | 4/2009 | Lee et al. |
| 2009/0106082 A1 | 4/2009 | Senti et al. |
| 2009/0144285 A1 | 6/2009 | Chatley et al. |
| 2009/0144416 A1 | 6/2009 | Chatley et al. |
| 2009/0150956 A1 | 6/2009 | Van De Leur et al. |
| 2009/0164642 A1 | 6/2009 | Foti |
| 2009/0187948 A1 | 7/2009 | Malik |
| 2009/0193481 A1 | 7/2009 | Huang |
| 2009/0265426 A1 | 10/2009 | Svendsen et al. |
| 2009/0282162 A1 | 11/2009 | Mehrotra et al. |
| 2010/0017820 A1 | 1/2010 | Thevathasan et al. |
| 2010/0020726 A1 | 1/2010 | Chu et al. |
| 2010/0064324 A1 | 3/2010 | Jenkin et al. |
| 2010/0070858 A1 | 3/2010 | Morris et al. |
| 2010/0095014 A1 | 4/2010 | Zuckerman et al. |
| 2010/0114921 A1 | 5/2010 | Bocharov et al. |
| 2010/0131671 A1 | 5/2010 | Kohli et al. |
| 2010/0153227 A1 | 6/2010 | Medvinsky et al. |
| 2010/0153237 A1 | 6/2010 | LaJoie et al. |
| 2010/0192174 A1 | 7/2010 | Hejna, Jr. |
| 2010/0205049 A1 | 8/2010 | Long et al. |
| 2010/0228975 A1 | 9/2010 | Lipka et al. |
| 2010/0242079 A1 | 9/2010 | Riedl et al. |
| 2010/0250549 A1 | 9/2010 | Muller et al. |
| 2010/0250633 A1 | 9/2010 | Hannuksela et al. |
| 2010/0250701 A1 | 9/2010 | Harvell et al. |
| 2010/0251289 A1 | 9/2010 | Agarwal et al. |
| 2010/0306655 A1 | 12/2010 | Mattingly et al. |
| 2010/0319044 A1 | 12/2010 | Agans et al. |
| 2011/0022471 A1 | 1/2011 | Brueck et al. |
| 2011/0035507 A1 | 2/2011 | Brueck et al. |
| 2011/0083144 A1 | 4/2011 | Bocharov et al. |
| 2011/0107379 A1 | 5/2011 | Lajoie et al. |
| 2011/0126248 A1 | 5/2011 | Fisher et al. |
| 2011/0138431 A1 | 6/2011 | Cedervall et al. |
| 2011/0173345 A1 | 7/2011 | Knox et al. |
| 2011/0179385 A1 | 7/2011 | Li et al. |
| 2011/0188439 A1 | 8/2011 | Mao et al. |
| 2011/0197237 A1 | 8/2011 | Turner |
| 2011/0200304 A1 | 8/2011 | Rutledge |
| 2011/0225315 A1 | 9/2011 | Wexler et al. |
| 2011/0296048 A1 | 12/2011 | Knox et al. |
| 2012/0054312 A1 | 3/2012 | Salinger |
| 2012/0079184 A1 | 3/2012 | Jaquette |
| 2012/0079546 A1 | 3/2012 | Kalidindi et al. |
| 2012/0128061 A1 | 5/2012 | Labrozzi et al. |
| 2012/0144302 A1 | 6/2012 | Campanotti et al. |
| 2012/0174157 A1 | 7/2012 | Stinson, III et al. |
| 2012/0219273 A1 | 8/2012 | McWilliams |
| 2012/0257671 A1* | 10/2012 | Brockmann ..... H04N 21/64753 375/240.02 |
| 2012/0265806 A1 | 10/2012 | Blanchflower et al. |
| 2012/0293605 A1 | 11/2012 | Seferian et al. |
| 2012/0317655 A1 | 12/2012 | Zhang et al. |
| 2012/0324489 A1 | 12/2012 | Greenfield |
| 2012/0331106 A1 | 12/2012 | Ramamurthy et al. |
| 2013/0007263 A1 | 1/2013 | Soroushian et al. |
| 2013/0013688 A1 | 1/2013 | Wang et al. |
| 2013/0013704 A1 | 1/2013 | Pope et al. |
| 2013/0089142 A1 | 4/2013 | Begen et al. |
| 2013/0097309 A1* | 4/2013 | Ma .................... H04L 29/08099 709/224 |
| 2013/0111606 A1 | 5/2013 | Gu |
| 2013/0142499 A1* | 6/2013 | Major ................ H04N 7/17336 386/341 |
| 2013/0145392 A1 | 6/2013 | Major et al. |
| 2013/0145408 A1 | 6/2013 | Major et al. |
| 2013/0145410 A1 | 6/2013 | Major et al. |
| 2013/0145411 A1 | 6/2013 | Major et al. |
| 2013/0145415 A1 | 6/2013 | Major et al. |
| 2013/0159544 A1 | 6/2013 | Cooper |
| 2013/0236158 A1 | 9/2013 | Lynch et al. |
| 2013/0254341 A1 | 9/2013 | Ramakrishnan |
| 2013/0254538 A1 | 9/2013 | Orsini et al. |
| 2013/0340022 A1 | 12/2013 | Antonov et al. |
| 2014/0108671 A1* | 4/2014 | Watson ............... H04L 65/4084 709/231 |
| 2014/0165116 A1 | 6/2014 | Major et al. |
| 2014/0189099 A1 | 7/2014 | Hurst et al. |
| 2014/0189143 A1 | 7/2014 | Muhlestein |
| 2014/0195675 A1* | 7/2014 | Silver ................ H04L 65/1083 709/224 |
| 2014/0229976 A1 | 8/2014 | Ma et al. |
| 2014/0233585 A1 | 8/2014 | Beers et al. |
| 2014/0237510 A1 | 8/2014 | Phillips et al. |
| 2014/0237534 A1 | 8/2014 | Salinger et al. |
| 2014/0250230 A1* | 9/2014 | Brueck ................ H04L 65/607 709/226 |
| 2014/0250473 A1 | 9/2014 | Braness et al. |
| 2014/0280498 A1 | 9/2014 | Frankel et al. |
| 2014/0317652 A1 | 10/2014 | Tam |
| 2014/0376370 A1 | 12/2014 | Cioffi et al. |
| 2015/0012658 A1 | 1/2015 | Elmore |
| 2015/0156556 A1 | 6/2015 | Lemmons |
| 2015/0312597 A1 | 10/2015 | Major et al. |
| 2015/0358858 A1 | 12/2015 | Xue |
| 2016/0044080 A1* | 2/2016 | DuBreuil ............ H04L 65/4076 709/219 |
| 2016/0337426 A1* | 11/2016 | Shribman ........... H04L 65/4084 |
| 2017/0347157 A1 | 11/2017 | Bergstrom |
| 2017/0366595 A1 | 12/2017 | Feher et al. |

FOREIGN PATENT DOCUMENTS

| | | |
|---|---|---|
| WO | 2007030813 A2 | 3/2007 |
| WO | 2008013350 A2 | 1/2008 |
| WO | 2008116305 A1 | 10/2008 |
| WO | 2009035466 A1 | 3/2009 |
| WO | 2010051169 A2 | 5/2010 |
| WO | 2011034955 A2 | 3/2011 |
| WO | 2012153290 A1 | 11/2012 |
| WO | 2013026081 A1 | 2/2013 |
| WO | 2013085920 A2 | 6/2013 |

OTHER PUBLICATIONS

European Patent Office, Patent Application in EP17188735.9 filed Aug. 31, 2017.

Europeant Patent Office, Decision to Grant in Application No. 12801787.8-1908 dated Aug. 31, 2017.

Wikipedia, the free encyclopedia, Adaptive Bitrate Streaming, Sep. 24, 2014; retrieved from the Internet at http://en.wikipedia.org/w/

(56) References Cited

OTHER PUBLICATIONS index.php?title=Adaptive.sub.--bitrate.sub.--str- eaming@oldid=528192400.
Anonymous: "Text of ISO/IEC 2nd DIS 23009-1 Dynamic Adaptive Streaming over HTTP", 97. MPEG Meeting; Jul. 18, 2011-Jul. 22, 2011; Torino; (Motion Picture Expert Group or ISO/IEC JTC1/SC29/WG11), No. N12166, Sep. 6, 2011 (Sep. 6, 2011), XP030018661.
T. Berners-Lee, Hypertext Transfer Protocol—HTTP/1.1 RFC 2616, Jun. 1999; Http://www.ietf.org/rtf.html, retrieved Jun. 1, 1999.
T. Berners-Lee, "Hyptertext Transfer Protocol—HTTP/1.1," Jun. 1999; retrieved from the Internet on Apr. 10, 2013 from http://www.w3.org/protocols, Chapters 5, 6, and 10.
Microsoft, How NTFS Works, Mar. 28, 2003, http://technet.microsoft.com/en-us/library/cc781134(v=ws.10).aspx.
International Searching Authority, Annex to Form PCT/ISA/206 Communication Relating to the Results of the Partial International Search, in PCT International Application No. PCT/US2012/067796, dated Mar. 12, 2013.
U.S. Appl. No. 61/567,513, filed Dec. 6, 2011.
Patent Cooperation Treaty, PCT International Patent Application No. PCT/US2012/067796 filed Dec. 4, 2012.
U.S. Appl. No. 13/706,983, filed Dec. 6, 2012.
U.S. Appl. No. 13/706,993, filed Dec. 6, 2012.
U.S. Appl. No. 13/707,008, filed Dec. 6, 2012.
U.S. Appl. No. 13/707,022, filed Dec. 6, 2012.
U.S. Appl. No. 13/707,031, filed Dec. 6, 2012.
U.S. Appl. No. 13/707,044, filed Dec. 6, 2012.
European Patent Office International Searching Authority, Invitation to Pay Additional Fees and, Where Applicable, Protest Fee, for PCT International Patent Application No. PCT/US2012/067796 dated Mar. 12, 2013.
U.S. Appl. No. 13/837,058, filed Mar. 15, 2013.
European Patent Office International Searching Authority, International Search Report and Written Opinion for International Patent Application No. PCT/US2012/067796 dated Jun. 7, 2013.
USPTO, Office Action in U.S. Appl. No. 13/706,983 dated Sep. 10, 2013.
USPTO, Office Action in U.S. Appl. No. 13/707,008 dated Sep. 13, 2013.
USPTO, Office Action in U.S. Appl. No. 13/707,022 dated Sep. 20, 2013.
USPTO, Office Action in U.S. Appl. No. 13/707,031 dated Sep. 25, 2013.
USPTO, Office Action in U.S. Appl. No. 13/707,044 dated Oct. 2, 2013.
Patent Cooperation Treaty, Patent Application No. PCT/US2013/078358 filed Dec. 30, 2013.
U.S. Appl. No. 14/145,025, filed Dec. 31, 2013.
USPTO, Final Office Action in U.S. Appl. No. 13/706,983 dated Jan. 10, 2014.
USPTO, Final Office Action in U.S. Appl. No. 13/707,008 dated Jan. 15, 2014.
USPTO, Office Action in U.S. Appl. No. 13/707,008 dated Feb. 24, 2014.
USPTO, Notice of Allowance and Fee(s) Due in U.S. Appl. No. 13/707,031 dated Mar. 4, 2014.
USPTO, Office Action in U.S. Appl. No. 13/706,983 dated Mar. 6, 2014.
USPTO, Final Office Action in U.S. Appl. No. 13/707,044 dated Mar. 12, 2014.
USPTO, Final Office Action in U.S. Appl. No. 13/707,022 dated Mar. 13, 2014.
European Patent Office International Searching Authority, International Search Report and Written Opinion in International Application No. PCT/US2013/078358 dated Apr. 17, 2014.
USPTO, Notice of Allowance and Fee(s) Due in U.S. Appl. No. 13/707,044 dated May 23, 2014.
USPTO, Notice of Allowance and Fee(s) Due in U.S. Appl. No. 13/707,022 dated May 27, 2014.
The International Bureau of WIPO, International Preliminary Report on Patentability in International Application No. PCT/US2012/067796 dated Jun. 19, 2014.
USPTO, Final Office Action in U.S. Appl. No. 13/707,008 dated Jul. 18, 2014.
USPTO, Office Action in U.S. Appl. No. 13/706,993 dated Aug. 21, 2014.
USPTO, Notice of Allowance and Fee(s) Due in U.S. Appl. No. 13/706,983 dated Aug. 25, 2014.
USPTO, Office Action in U.S. Appl. No. 13/837,058 dated Oct. 9, 2014.
USPTO, Office Action in U.S. Appl. No. 13/707,008 dated Nov. 3, 2014.
USPTO, Notice of Allowance and Fee(s) Due in U.S. Appl. No. 13/706,983 dated Nov. 6, 2014.
USPTO, Notice of Allowance and Fee(s) Due in U.S. Appl. No. 13/837,058 dated Feb. 3, 2015.
USPTO, Notice of Allowance and Fee(s) Due in U.S. Appl. No. 13/706,993 dated Feb. 27, 2015.
USPTO, Notice of Allowance and Fee(s) Due in U.S. Appl. No. 13/707,008 dated Mar. 4, 2015.
USPTO, Office Action in U.S. Appl. No. 14/144,235 dated Apr. 2, 2015.
U.S. Appl. No. 14/792,485, filed Jul. 6, 2015.
The International Bureau of WIPO, International Preliminary Report on Patentability in International Application No. PCT/US2013/078358 dated Jul. 9, 2015.
USPTO, Office Action in U.S. Appl. No. 14/145,115 dated Aug. 21, 2015.
USPTO, Office Action in U.S. Appl. No. 14/145,025 dated Nov. 5, 2015.
USPTO, Final Office Action in U.S. Appl. No. 14/144,235 dated Nov. 25, 2015.
USPTO, Office Action in U.S. Appl. No. 14/792,485 dated Dec. 18, 2015.
USPTO, Notice of Allowance and Fee(s) due in U.S. Appl. No. 14/792,485 dated May 4, 2016.
European Patent Office, Communication pursuant to Rule 164(2)(b) and Article 94(3) EPC in Patent Application No. 12 801 787.8-1908 dated Jun. 6, 2016.
U.S. Appl. No. 15/247,147, filed Aug. 25, 2016.
USPTO, Office Action in U.S. Appl. No. 15/247,147 dated Feb. 8, 2017.
European Patent Office, Communication under Rule 71(3) EPC in Application No. 12 801 787.8-1908 dated Apr. 7, 2017.
European Patent Office International Searching Authority, International Search Report and Written Opinion in International Application No. PCT/US2016/068963 dated Mar. 22, 2017.
European Patent Office International Searching Authority, International Search Report and Written Opinion in International Application No. PCT/US2016/068956 dated Mar. 23, 2017.
European Patent Office International Searching Authority, International Search Report and Written Opinion in International Application No. PCT/US2016/068958 dated Mar. 23, 2017.
European Patent Office International Searching Authority, International Search Report and Written Opinion in International Application No. PCT/US2016/068960 dated Mar. 23, 2017.
USPTO, Non-Final Office Action in U.S. Appl. No. 15/392,241 dated Nov. 1, 2017.
USPTO, Office Action in U.S. Appl. No. 15/392,241 dated Nov. 1, 2017.
USPTO, Final Office Action in U.S. Appl. No. 15/392,241 dated Feb. 9, 2018.
USPTO "International Search Report" dated Dec. 12, 2008; International Appln. No. PCT/US2008/061035, filed Apr. 21, 2008.
Tvede, Lars, et al., "The Five Basic Formats of Data Broadcasting" Data Broadcasting: Merging Digital Broadcasting with the Internet, 2001.
Pathan, Al-Mukaddim, et al., "A Taxonomy and Survey of Content Delivery Networks", Australia, Feb. 2007. Available at http://www.gridbus.org/reports/CDN-Taxonomy.pdf.
Brueck, et al., U.S. Appl. No. 12/508,449, filed Jul. 23, 2009.

(56) References Cited

OTHER PUBLICATIONS

USPTO, Office Action in U.S. Appl. No. 12/508,449 dated Feb. 21, 2012.
USPTO, Final Office Action in U.S. Appl. No. 12/508,449 dated Jul. 17, 2012.
USPTO, Office Action in U.S. Appl. No. 12/508,449 dated Nov. 7, 2014.
USPTO, Final Office Action in U.S. Appl. No. 12/508,449 dated Jun. 5, 2015.
USPTO, Final Office Action for U.S. Appl. No. 15/392,235 dated Jul. 26, 2018.
USPTO, Notice of Allowance for U.S. Appl. No. 15/392,235 dated Oct. 9, 2018.
USPTO, Non-Final Office Action for U.S. Appl. No. 15/392,235 dated Jan. 12, 2018.
USPTO, Office Action in U.S. Appl. No. 15/392,241 dated Aug. 15, 2018.

* cited by examiner

METHODS AND SYSTEMS FOR ASSISTED CONTENT DELIVERY

CROSS-REFERENCE TO RELATED APPLICATIONS

This application claims the benefit of U.S. provisional patent application Ser. No. 62/272,438, filed Dec. 29, 2015, the entire content of which is incorporated by reference herein.

This application is related to U.S. patent application Ser. No. 15/392,212, U.S. patent application Ser. No. 15/392,235, and U.S. patent application Ser. No. 15/392,241, all filed concurrently herewith.

TECHNICAL FIELD

Embodiments of the subject matter described herein relate generally to content delivery over a network, and more particularly, delivery systems, devices, and related operating methods for streaming multimedia content using one or more content delivery networks (CDNs), origin servers, and remote storage digital video recorder (RS-DVR) networks.

BACKGROUND

Telecommunications networks, such as the Internet, are expected to become predominant means for distributing multimedia content (e.g., video and audio or audio) to end users. The quality of the viewer experience is a key barrier to the growth of video viewing on-line. Even with current capacity and demand, performance can be uneven, with streams starting slowly, stopping unexpectedly, or exhibiting synchronization issues. Many of these issues can be traced to the unpredictable nature of the Internet and uncertain capacity at the consumer access level. Consumer expectations for online video, however, are set by their previous television and movie viewing experiences.

Appointment TV and "live" event broadcasts, whether distributed over the air, via cable, or through satellite, attract very large audiences. There is growing interest and demand for streaming and viewing video of "live" events on the Internet. Streaming of data files or "streaming media" refers to technology that delivers sequential multimedia content at a rate sufficient to present the multimedia to a user at the originally anticipated playback speed without significant interruption. In this context, "live" means that the multimedia content is anchored to a particular point in time for playing the multimedia content. That is, particular pieces of multimedia content of the live event are played by a media player according to a schedule of the live event; for example, the beginning of the video is scheduled to be played by the media player at a particular point in time.

Streaming multimedia content of live events over the Internet has numerous challenges, namely that network congestion or other delivery issues may reside or otherwise fall within the purview of a third party intermediary that is responsible for managing, regulating, or otherwise controlling a particular aspect of delivery between end points, such as, for example, an Internet backbone provider, an Internet service provider (ISP), a content delivery network (CDN), or the like. While it is to some extent possible to improve streaming capabilities through dedicated infrastructure upgrades or bandwidth, the expenditures necessary to accommodate both current and anticipated future demand can be exorbitant. Thus, adaptive bit rate streaming is commonly utilized to compensate for delivery issues, at the expense of compromising the video quality, and thereby the viewing experience.

In view of the foregoing, it is now desirable to provide techniques for delivering digital media content in a reliable manner, over telecommunications networks, under varying degrees of congestion, and in a cost effective manner without compromising the viewing experience. Other desirable features and characteristics will become apparent from the subsequent detailed description and the appended claims, taken in conjunction with the accompanying drawings and the foregoing technical field and background.

BRIEF SUMMARY

Embodiments of methods and systems for adaptive content delivery are provided. An exemplary method of streaming media content over a network comprises obtaining, at a client device coupled to the network from a device coupled to the network, a prioritized list of a plurality of content delivery sources on the network, selecting, by a media player at the client device, a first content delivery source of the plurality of content delivery sources based at least in part on the prioritized list, and requesting, by the media player, the media content from the first content delivery source via the network. Another exemplary method of streaming media content over a network comprises receiving, from a plurality of media players on the network, performance data associated with one or more of a plurality of content delivery sources on the network, determining, based at least in part on the performance data, a prioritized list of the plurality of content delivery sources, and providing the prioritized list to the plurality of media players via the network. Also provided is an embodiment of a non-transitory computer-readable medium having computer-executable instructions stored thereon that, when executed by a processing system of a client device coupled to a network, cause the processing system to obtain a prioritized list of a plurality of content delivery sources on the network from a device on the network, select a first content delivery source of the plurality of content delivery sources based at least in part on the prioritized list, request one or more segments of media content from the first content delivery source via the network, and present the one or more segments received from the first content delivery source on the client device.

Embodiments of methods and systems for origin-assisted content delivery are also provided. An exemplary method of streaming media content over a network comprises detecting, by a media player at a client device coupled to the network, a first condition with respect to streaming the media content, and in response to the first condition, requesting, by the media player, a first portion of the media content from an origin server on the network. After requesting the first portion of the media content, the method further comprises detecting, by the media player, a second condition with respect to streaming the media content, and in response to detecting the second condition, requesting, by the media player, a subsequent portion of the media content from a first content delivery source on the network. The first content delivery source may be selected by the media player from among a plurality of content delivery sources based at least in part on a prioritized list of content delivery sources. Another exemplary method of streaming media content over a network comprises receiving, at an origin server, a request for a portion of the media content via the network, identifying, by the origin server, the request as originating from a media player on a client device, and in response to identifying the request as originating from the media player, transmitting the requested portion of the media content to the client device using a modified transport layer protocol. Also provided is an embodiment of a non-transitory computer-readable medium having computer-executable instructions stored thereon that, when executed by a processing system of a client device coupled to a network, cause the processing system to detect a first condition with respect to streaming media content, in response to detecting the first condition, request a first portion of the media content from an origin server on the network, thereafter detect a second condition with respect to streaming the media content, and in response to detecting the second condition, request a subsequent portion of the media content from a first content delivery source on the network.

Embodiments of methods and systems for remote storage digital video recorder (RS-DVR) live streaming are also provided. An exemplary method of streaming media content over a network using a RS-DVR system comprises receiving, at the RS-DVR system, a request for a portion of the media content from a media player on a client device via the network, receiving, at the RS-DVR system, the portion of the media content from an origin server on the network, buffering the portion of the media content at the RS-DVR system, and transmitting the portion of the media content to the media player on the client device. The portion of media content may be marked as non-cacheable and transmitted using a modified transport layer protocol. Another method of streaming media content over a network using a RS-DVR network comprises receiving, at the RS-DVR network, a request for streaming the media content from a media player on a client device via the network, identifying, at the RS-DVR network, a first RS-DVR system of a plurality of RS-DVR systems associated with the RS-DVR network for streaming the media content, receiving, at the first RS-DVR system, a portion of the media content from an origin server on the network, buffering, at the first RS-DVR system, the portion of the media content, and transmitting, by the first RS-DVR system, the portion of the media content to the media player on the client device. An embodiment of an RS-DVR system is also provided. The RS-DVR system comprises a network interface to communicate via a network, a per-subscriber data storage to store per-subscriber rights media content, a shared data storage to store shared rights media content, and a processing module coupled to the network interface and the shared data storage to receive a request to stream media content from a media player on a client device via the network, receive a portion of the media content from an origin server on the network, store the portion of the media content in the shared data storage, and transmit the portion of the media content from the shared data storage to the media player on the client device via the network.

Embodiments of methods and systems for dynamic content delivery routing are also provided. An exemplary method of streaming media content over a network comprises transmitting one or more portions of the media content to the client device via a delivery route between a content delivery source and the network, determining a performance metric associated with the transmitting of the one or more portions via the delivery route, and dynamically adjusting the delivery route between the content delivery source and the network based at least in part on the performance metric. Another method of streaming media content over a network comprises receiving, at a RS-DVR system, requests for the media content from a client device on the network, transmitting, by the RS-DVR system, one or more portions of the media content to the client device via a first delivery route between the RS-DVR system and the network, determining a performance metric associated with the transmitting of the one or more portions via the first delivery route, and transmitting, by the RS-DVR system, a subsequent portion of the media content to the client device via a second delivery route between the RS-DVR system and the network based on the performance metric, wherein the second delivery route is different from the first delivery route. Also provided is an embodiment of a dynamic content delivery routing system comprising a networking component coupled to a network via a plurality of delivery routes, and a content delivery source coupled to the network via the networking component, wherein the content delivery source and the networking component are cooperatively configured to transmit one or more portions of media content over the network to a client device on the network via a first delivery route of the plurality of delivery routes and transmit a subsequent portion of the media content over the network to a the client device via a second delivery route of the plurality of delivery routes based on a performance metric associated with the transmitting of the one or more portions via the first delivery route.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
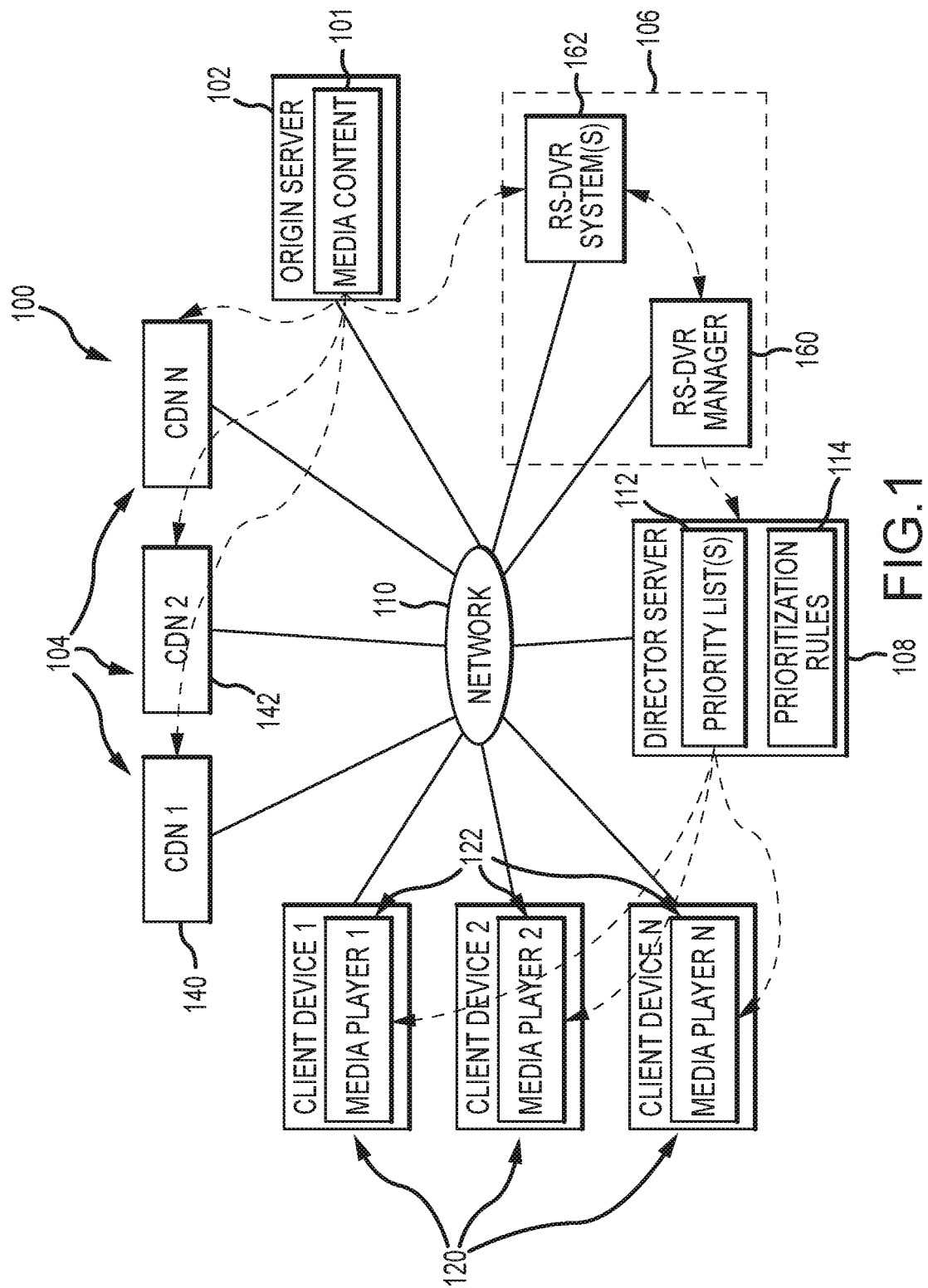
FIG. 1 depicts a schematic representation of an exemplary embodiment of a multimedia streaming system.

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to dynamically and intelligently delivering media content over a communications network in a manner that is cost effective, reliable, and resilient to provide an improved user experience. As used herein, "media content," "media program," "multimedia content," or variants thereof should be understood as referring to any audiovisual programming or content in any streaming, file-based or other format. The media content generally includes data that, when processed by a media player (operating on an electronic device), allows the media player to present a visual and/or audio representation of the corresponding program content to a viewer (i.e., user of the media player). The media player can be realized as a piece of software that plays the multimedia content (e.g., displays video and plays audio), and depending on the embodiment, the media player can be a standalone software application, a web browser plug-in, a combination of browser plug-in and supporting web page logic, or the like.

While there are two general types of multimedia streaming, namely push-based streaming and pull-based streaming, exemplary embodiments are described herein in the context of pull-based streaming, where the request for transmission of information is initiated by a client device (or the media player executing thereon) and is responded to by a server or other source for delivering content satisfying the request. By way of example, one type of request in pull technology is a Hypertext Transfer Protocol (HTTP) request (e.g., a HTTP GET request) transmitted over a network using the Transport Control Protocol (TCP). That said, the subject matter described herein is not necessarily limited to pull-based streaming or a particular protocol, and maybe implemented in an equivalent manner to accomplish push-based streaming using similar or different protocols.

While the subject matter described herein is not necessarily limited to any particular type of media content, for purposes of explanation, the subject matter may be described herein in the context of delivering multimedia content of a live event where real-time delivery (or as close as possible to real-time delivery) is generally desirable. For example, the live event may be a television broadcast, such as of a sporting event, a live performance, a live news report, or the like. The live event may also have pre-recorded content intermingled with the live multimedia content, such as slow-motion clips of important events within the live event (e.g., replays), which are played in between the live telecast. More importantly than the type of broadcast, the live event is scheduled to be played at a particular point in time according to a schedule of the live event (e.g., there is a "live" point in time to which playback should be synchronized with for playback), as compared to recorded multimedia, video on-demand (VOD), or the like where there is no concept of "lag behind live" when not being played back according to a schedule (e.g., because the program content is pre-recorded and is available in its entirety before playback begins).

In exemplary embodiments described herein, potential content delivery sources are ranked, ordered or otherwise organized relative to one another using a combination of prioritization rules and factors to arrive at a prioritized list, which, in turn, is distributed to media players and utilized to identify the particular content delivery source from which to request the desired media content. In this regard, the relative cost associated with each respective content delivery source in conjunction with its relative performance, geographic characteristics, or other factors may be weighted or otherwise compared to the other possible content delivery sources to identify the most advantageous or beneficial content delivery source(s) relative to the others, with the priority list ordering the content delivery sources accordingly. For example, the more highly ranked content delivery sources may achieve lower costs to the provider, better performance for end users, or a desired tradeoff therebetween, while lower ranked content delivery sources are associated with higher costs and/or worse performance. Thus, an administrator or provider may configure the prioritized list in a manner that achieves the most cost effective allocation of available delivery resources while also accounting for the performance or user experience. The prioritized list may be dynamically updated based on real-time performance feedback or other new or updated information (e.g., updated prioritization rules), which, in turn, facilitates dynamic rebalancing the usage of the various content delivery sources. For example, as the performance of a particular content delivery source begins to suffer or the available bandwidth associated with a particular content delivery source decreases, that content delivery source may be lowered on the priority list, resulting in an updated priority list, which, in turn, may be pushed to various media players, thereby influencing future utilization of the content delivery sources.

As described below in the context of FIG. 7, in exemplary embodiments, each media player utilizes the prioritized list to select or otherwise identify, from among the plurality of different potential content delivery sources, the particular content delivery source from which the media player should request media content. The media player may apply various client-side heuristics or utilize other client-specific data, information, or needs to adjust or otherwise modify the prioritized list in a client-specific manner before selecting the highest ranked content delivery source. In this regard, the highest ranked content delivery source is most likely to achieve a desired tradeoff between that provider-dictated priority for the selected content delivery source (e.g., relative to other potential content delivery sources) versus the anticipated user experience. For example, a media player that has historically experienced difficulty with a higher prioritized content delivery source may initially bypass that content delivery source to select or identify a lower prioritized content delivery source. As another example, a media player associated with a higher priority user (e.g., a user that has a particular type of subscription or paid a premium for the media content) or higher priority media content (e.g., from a content source that has paid a premium for better delivery) may bypass a higher prioritized content delivery source to select or identify a lower prioritized content delivery source that is likely to provide better performance. During streaming of the media content from a particular content delivery source, as delivery conditions change (e.g., due to network congestion, outages, or the like), a media player may utilize the priority list to select or otherwise identify a different content delivery source to maintain a satisfactory user experience. Thus, media players may dynamically and intelligently automatically move between content delivery sources to maintain the integrity of the media content being presented in a manner that is substantially imperceptible to the user.

Figure 8:
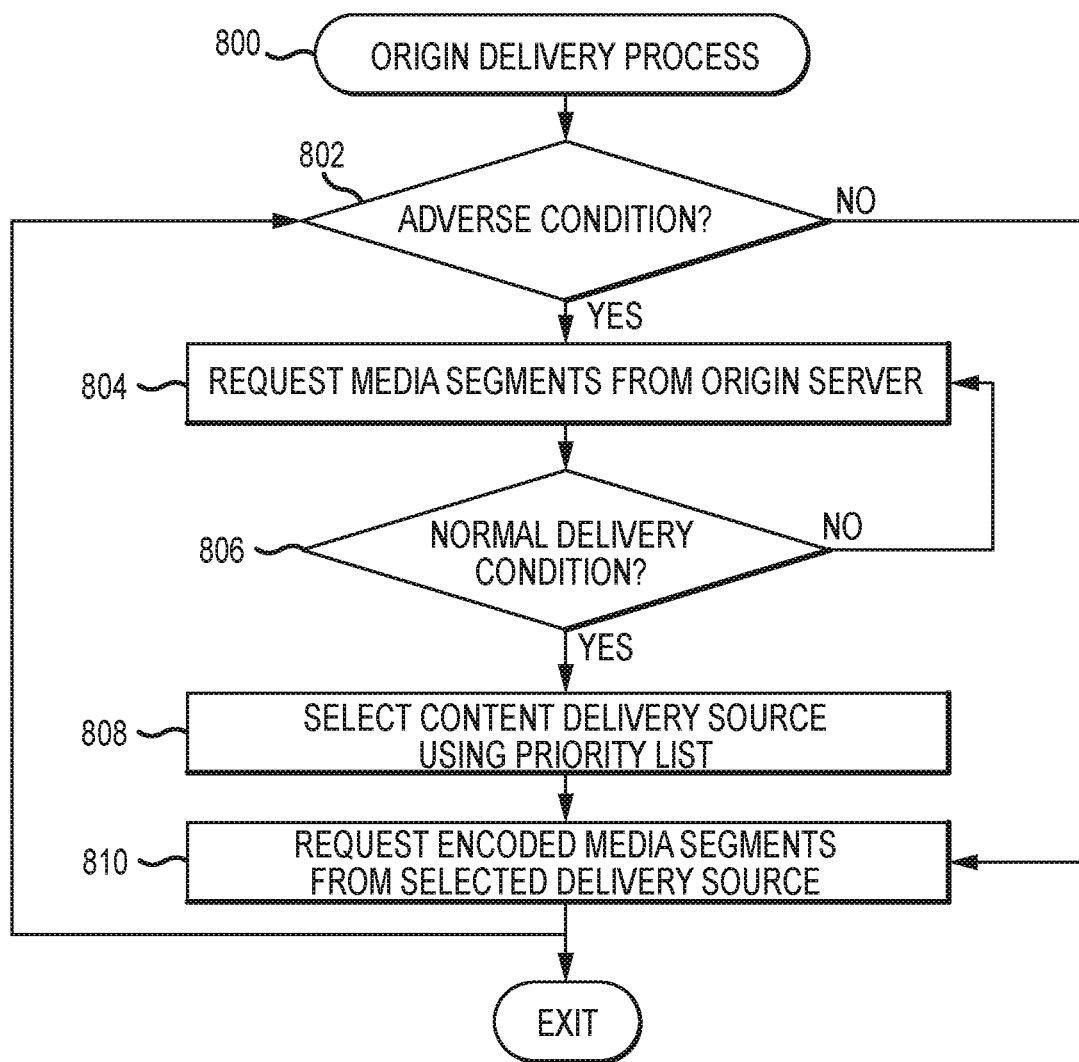
FIG. 8 is a flowchart of an exemplary origin delivery process suitable for use with a multimedia streaming system in accordance with one or more embodiments.

As described in greater detail in the context of FIG. 8, in some conditions, a media player may effectively default to requesting media content from an origin server to achieve more prompt and reliable delivery of the media content, rather than utilizing the priority list to select a content delivery source. For example, upon initiation of streaming content (e.g., starting viewing a particular media program or channel, changing between media programs or channels, or the like), the media player may initially request media content from the origin server to facilitate beginning presentation of the media content as quickly as possible and minimize lag behind live time. Alternatively, when a previously selected content delivery source fails to deliver requested media content and a media player's presentation buffer becomes depleted, the media player may request the media content from the origin server to maintain presentation of the media content without buffering delays that could degrade the user experience. In exemplary embodiments, the origin server is configured to respond to the requests by delivering the requested media content using a modified transport layer protocol (e.g., by modifying the TCP stack) that increases the likelihood of successful delivery.

Due to the costs associated with an origin server servicing delivery requests, the origin server may be prioritized at the bottom of the priority list so that it is utilized by media players as infrequently as possible. Additionally, requests to the origin server may be constrained, so that the media players automatically revert to requesting media content from a different content delivery source. For example, a media player may be configured to stop requesting media content from an origin server when its presentation buffer is full (or otherwise above a threshold) or when a duration of time associated with the origin server requests exceeds a threshold amount of time (e.g., a maximum allowable time period for an origin server servicing a particular media player). Thus, the media player may automatically determine that requests should no longer be sent to the origin server, and in response, identify or otherwise select a different content delivery source using the priority list and request subsequent portions of the media content from that content delivery source. In some embodiments, the origin server may also monitor or track requests from a particular media player and automatically stop servicing those requests when a duration of time or a number of requests associated with that media player exceed an applicable threshold.

As described in greater detail below in the context of FIGS. 13-14, in some embodiments, a content delivery source may select or otherwise identify a particular delivery route (or path) on the network to be used when responding to requests from a particular media player. In this regard, a content delivery source may be communicatively coupled to a router or similar networking device, which, in turn, provides connectivity to the communications network via a plurality of different network routes or paths. For example, in one or more embodiments, the router is connected to a plurality of different internet backbone provider networks, which, in turn may be utilized, to deliver media content from the content delivery source to a client device for at least an initial portion of the entire delivery path (or route) traversed by the transmitted portions of media content.

Based on the geographic location or network location (e.g., destination address) associated with a client device in conjunction with a routing table, the router may default to initially transmitting portions of media content from the content delivery source to the client device via a particular internet backbone provider. Thereafter, during streaming, the content delivery source may monitor or otherwise assess the current streaming performance, and based thereon, select or otherwise identify whether a different delivery route should be utilized. For example, when the bandwidth transmitted to (or received by) the client device falls below a threshold level, the content delivery source may identify or otherwise select a different internet backbone provider from among the different internet backbone provider networks available to the router, and instruct or otherwise command the router to transmit subsequent portions of media content to that destination client device via another internet backbone provider (or initial delivery route) that is different from the initial internet backbone provider or delivery route (e.g., the default route that would otherwise be identified using a routing table). The content delivery source may dynamically update or otherwise adjust the delivery route from the router that is utilized for a particular client device as needed in an attempt to achieve a desired performance and mitigate an adverse condition (e.g., a lower bitrate, a low presentation buffer, a higher cost content delivery source, or the like) with respect to the streaming content. Thus, the need for a media player to request media content from an origin server or a lower priority (or less advantageous) content delivery source may be avoided by the previously selected content delivery source proactively adjusting the delivery route utilized by a router.

As described in greater detail below, and in particular with reference to FIGS. 9-14, in some embodiments, one or more remote storage digital video recorder (RS-DVR) systems are capable of functioning as content delivery sources that service requests to stream live multimedia content. In this regard, while RS-DVR systems typically store individualized recordings of media content for later playback, in some conditions, an RS-DVR system may transmit a live stream substantially in real-time to a requesting media player. As described in greater detail below, in some embodiments, the media segments (e.g., HTTP video objects) provided by the RS-DVR system are marked as non-cacheable to ensure that the media segments are only delivered to a requesting media player or subscriber. In one or more embodiments, to ensure reliable delivery or to compensate for the lack of edge caching, an RS-DVR system may respond to live streaming requests by delivering media segments using a modified transport layer protocol that increases the likelihood of successful delivery. Additionally, the RS-DVR system may dynamically adjust the delivery route used for servicing requests to maintain or otherwise improve performance and reduce the likelihood that a media player will need to request media content from another content delivery source.

Requests from media players may be dynamically redirected to/from the RS-DVR systems based on the current bandwidth of the RS-DVR systems being consumed for recorded content. For example, an RS-DVR system may have an allocated amount of backhaul bandwidth associated therewith, with the amount of live streaming requests serviced by the RS-DVR system being based on the difference between the current utilization of the backhaul bandwidth and the allocated amount of backhaul bandwidth. Thus, as the difference between the allocated amount of backhaul bandwidth paid for by a provider and the amount of backhaul bandwidth currently utilized for recorded media content increases, the priority of the RS-DVR system(s) in the priority list may be elevated to increase the amount of live streaming requests serviced by the RS-DVR system(s), thereby avoiding undesirable underutilization of the allocated bandwidth. Conversely, as the bandwidth needs for recorded media content increases, the priority of the RS-DVR system(s) in the priority list may be lowered to redirect live streaming requests away from the RS-DVR system(s) to avoid potentially compromising playback of recorded media content.

System Overview

FIG. 1 depicts an exemplary embodiment of a multimedia streaming system 100 capable of performing or otherwise supporting the various tasks, operations, processes and methods described herein. The illustrated multimedia streaming system 100 includes a plurality of content delivery sources, such as, for example, an origin content server 102, one or more content delivery networks (CDNs) 104, and an RS-DVR network 106. Each of the content delivery sources 102, 104, 106 is communicatively coupled to a communications network 110, such as the Internet, and each of the content delivery sources 102, 104, 106 is capable of streaming, transmitting, or otherwise providing multimedia content reproducible by media players 122 executing on client devices 120 communicatively coupled to the network 110. As described in greater detail below in the context of FIGS. 7-9, in exemplary embodiments, a director server 108 is communicatively coupled to the network 110 to receive playback performance feedback from the media players 122. The director server 108 utilizes the playback performance feedback in conjunction with various prioritization rules 114 to dynamically generate one or more priority lists 112, which, in turn, influence from which particular one of the content delivery sources 102, 104, 106 a respective one of the media player 122 requests media content 101.

The origin content server 102 generally represents a computer system that is configured to receive or otherwise obtain media content 101 directly from a content provider. For example, the origin content server 102 may be part of a provider headend or master control that receives or otherwise obtains signals representative of multimedia content and encodes or otherwise converts those signals into discrete segments or files corresponding to the multimedia content 101, which are then stored or otherwise maintained by the origin content server 102. In exemplary embodiments described herein, the origin server 102 includes or otherwise coordinates with a real-time encoding system configured to convert the multimedia content into fixed duration media segments (or streamlets) that are stored or otherwise maintained in a data storage element at the origin server 102 (e.g., in a cache of the origin server 102). The origin content server 102 includes a processing system and/or other hardware computing resources along with one or more data storage elements (or memory) capable of storing encoded multimedia content 101 and supporting the subject matter described herein. For example, the origin content server 102 may include one or more caches that store encoded multimedia content 101 and leverage an HTTP accelerator to facilitate distributing the encoded multimedia content 101 to other content delivery sources 104, 106, and potentially client devices 120 as needed, as described in greater detail below.

Each CDN 104 generally represents a third-party system of computers and/or other devices networked together across the network 110 that cooperate transparently to deliver content, and may include one or more web servers, cache servers, or the like. Typically, the CDN is configured in a hierarchy so that a client device 120 requests the data from an edge cache, for example, and if the edge cache does not contain the requested data, the request is sent to a parent cache, and so on up to the respective CDN 104 requesting the data from the origin content server 102. In general, a provider or operator associated with the origin content server 102 enters into contractual agreements with the respective CDNs 104, where the cost associated with utilizing a particular CDN 104 is influenced by the amount of data associated with that provider that is delivered by that CDN 104 to various client devices 120. As described in greater detail below, the costs associated with the respective CDNs 104 available for use within the multimedia streaming system 100 are one factor that may be utilized by the director server 108 when generating priority list(s) 112 provided to the media players 122.

The RS-DVR network 106 generally represents another system of computers and/or other devices networked together across the network 110, which are configured to copy or otherwise record media programs available from the origin content server 102 on behalf of individual users or subscribers for subsequent playback. In an exemplary embodiment, the RS-DVR network 106 is controlled or otherwise operated by the provider associated with the origin content server 102. The illustrated RS-DVR network 106 includes a plurality of RS-DVR systems 162 coupled to the communications network 110, which, in turn, communicate with one or more RS-DVR managers 160 coupled to the network 110. Although not always required, the RS-DVR manager 160 may be deployed to manage, control, or otherwise regulate the operation of the RS-DVR systems 162 and their associated bandwidth utilizations. As described in greater detail below, the RS-DVR network 106 and/or the RS-DVR systems 162 may have a predetermined amount of allocated backhaul bandwidth over the network 110, which is another factor that may be utilized by the director server 108 when generating priority list(s) 112 provided to the media players 122.

The RS-DVR manager 160 may be implemented as a server that manages a designated group of RS-DVR systems 162. Although only one RS-DVR manager 160 is depicted in FIG. 1, an embodiment of the multimedia streaming system 100 could include more than one RS-DVR manager 160 to handle any number of defined groups of RS-DVR systems 162. Each RS-DVR system 162 is configured to receive digital media content in a multiple bitrate format, record one or more versions of the media content in association with corresponding clients or users, and initiate playback of stored media content at the request of one of those clients or users. In this regard, the RS-DVR systems 162 can be designed to function like a traditional DVR, wherein each client or user has a "personal" copy of recorded content, even though the copies are held on shared servers and shared storage media (e.g., hard disks). Exemplary embodiments of the RS-DVR systems 162, along with various operating features and functions, are described in detail below.

In the illustrated embodiment, the director server 108 generally represents another computer system on the network 110 that is controlled or otherwise operated by the provider associated with the origin content server 102. As described in greater detail below, in exemplary embodiments, the director server 108 is configured to generate one or more priority lists 112 indicating the relative priorities of the various available content delivery sources 102, 104, 106. For example, the director server 108 may generate different priority lists 112 for different classes of users (e.g., based on different access rights or subscription levels), for different classes of multimedia content to be streamed (e.g., premium content versus regular content), for different geographic or network locations, and the like. In exemplary embodiments, relative priorities are assigned to each of the content delivery sources based on various cost, bandwidth, performance, or other miscellaneous metrics associated with the respective content delivery sources, geographic information associated with the respective content delivery sources, and/or potentially other factors in conjunction with various source prioritization rules or criteria 114 that may be dictated by the provider. For example, the director server 108 may calculate or otherwise determine a priority score for each content delivery source 102, 104, 106 as a function of the provider-side prioritization rules 114 and the various factors associated with the respective content delivery sources 102, 104, 106, and thereafter rank or otherwise order the content delivery sources 102, 104, 106 according to their priority score.

In one or more exemplary embodiments, the prioritization rules 114 maintained by the director server 108 also include client-side prioritization rules, which, in turn, may be provided to the client devices 120 for use in modifying or otherwise adjusting a priority list 112 in a client-specific manner, as described in greater detail below. The priority list(s) 112 and client-side prioritization rules 114 are transmitted or otherwise provided to the media players 122, which, in turn, guide or otherwise influence the media players 122 when requesting multimedia content for streaming over the network 110. In some embodiments, the media players 122 may be configured to request or otherwise retrieve a priority list 112 from the director server 108 upon startup or initialization of a stream. In other embodiments, the director server 108 may be configured to push or otherwise broadcast the priority list(s) 112 to any media players 122 currently communicating on the network 110. In exemplary embodiments, the media players 122 are also configured to transmit or otherwise provide performance feedback pertaining to any content delivery sources 102, 104, 106 from which the respective media player 122 has requested content, which, in turn, can be utilized by the director server 108 to dynamically update the priority list(s) 112 to reflect the current performance of the content delivery sources 102, 104, 106 on the network 110. In such embodiments, each time a priority list 112 is updated, the director server 108 may automatically push the updated priority list 112 to any media players 122 currently communicating on the network 110 or otherwise notify active media players 122 of the updated priority list 112.

Still referring to FIG. 1, the client devices 120 may be realized as any type of electronic device suitable for communicating on the network 110 and presenting or otherwise reproducing media content 101 to a user, such as, for example, a mobile or cellular telephone, a smartphone, a laptop or notebook computer, a tablet computer, a desktop computer, a personal digital assistant, a video game player, a portable media player or another media playback device, an e-reader, a wireless router, a wireless access point, a smart TV, a set-top box, a television receiver, a satellite receiver, or the like. The client device 120 includes at least a processing system, a data storage element (or memory), and an output device for reproducing media content 101 (e.g., a display device, an audio output device, or the like). The processing system may be implemented using any suitable processing system and/or device, such as, for example, one or more processors, central processing units (CPUs), controllers, microprocessors, microcontrollers, processing cores and/or other hardware computing resources configured to support the operation of the client devices 120 described herein. The data storage element is capable of storing programming instructions for execution by the processing system, that, when read and executed, cause processing system to create, generate, or otherwise facilitate a respective media player application 122 configured to support streaming media content 101 over the network 110 for reproduction by the output device of the respective client device 120. Though the subject matter may be described herein in the context of a media player being a standalone application, in alternative embodiments, the media player may be a web browser plug-in, a combination of browser plug-in and supporting web page logic, or the like.

Figure 2:
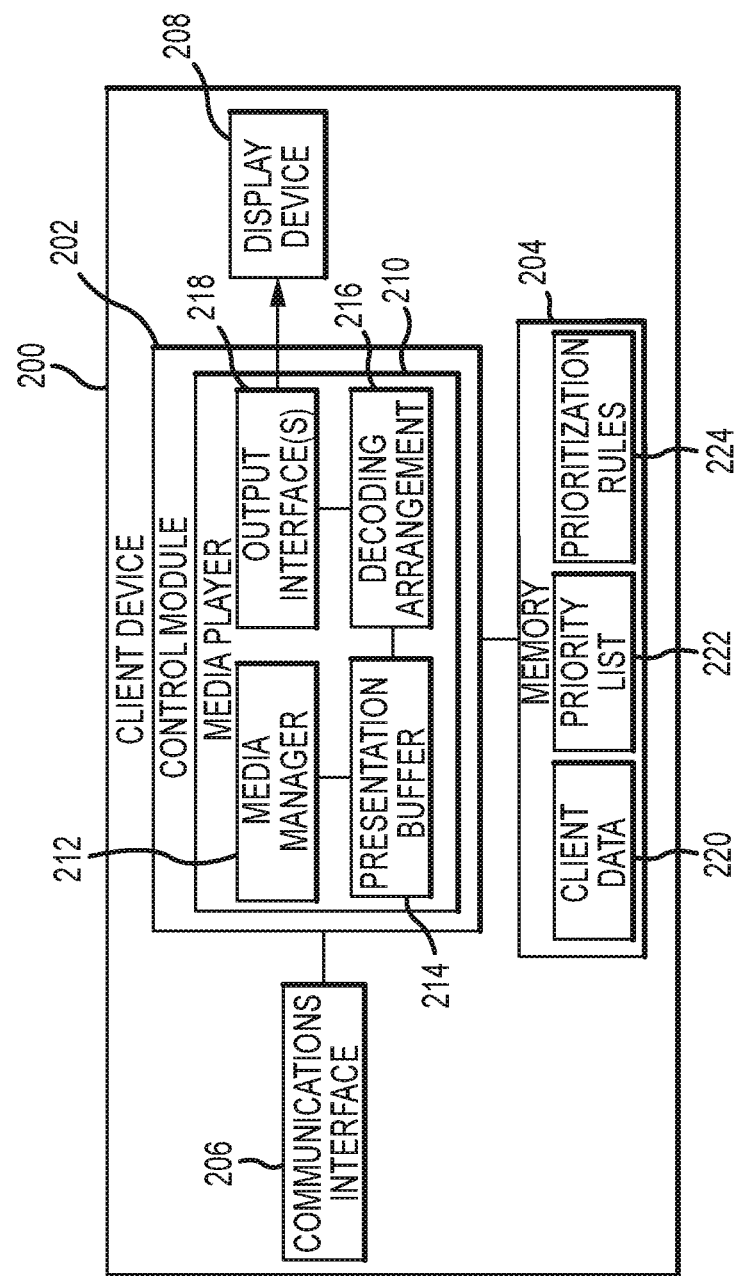
FIG. 2 is a block diagram of an exemplary embodiment of a client device suitable for use in the content delivery system of FIG. 1.

FIG. 2 depicts an exemplary client device 200 suitable for use as one or more of the client devices 120 in the multimedia streaming system 100 of FIG. 1. The illustrated client device 200 includes a control module 202, one or more data storage elements 204, a communications interface 206 and a display device 208. The control module 202 executes, implements, or otherwise supports a media player 210 that receives encoded media segments from a network (e.g., network 110) via the communications interface 206 and generates corresponding audiovisual multimedia content on the display device 208, as described in greater detail below.

The communications interface 206 is coupled to the control module 202 and generally represents the hardware, circuitry, logic, firmware and/or other components of the client device 200 that are configured to support communications via a network (e.g., network 110). Depending on the embodiment, the communications interface 206 may include or otherwise be coupled to one or more wireless transceiver modules capable of supporting wireless communications, a cellular transceiver, a wired network interface controller (e.g., an Ethernet adapter), or another suitable network interface (e.g., a port that is adapted to receive a wireless adapter).

The display device 208 is coupled to the control module 202 generally represents a monitor, liquid crystal display (LCD), light emitting diode (LED) display, plasma display, television, or the like that graphically presents, renders, or otherwise displays imagery and/or video corresponding to streaming media content received by the client device 200 via the network. In some embodiments, the display device 208 may also generate sound or otherwise reproduce the audio corresponding to the audio portion of the media content, while in other embodiments, a separate audio output device (e.g., one or more headphones, speakers, or the like) may be utilized for reproducing audio. Additionally, it should be noted that while FIG. 2 depicts the display device 208 as being integrated with the client device 200, in some embodiments, the display device 208 may be physically distinct or otherwise separate from the client device 200. For example, the client device 200 may be realized as a set-top box (STB), satellite receiver, television receiver, or the like, in which case the display device 208 may be realized as a television or monitor connected to a video output interface of the client device 200.

The control module 202 represents the processing system, processing device, hardware, firmware, and/or other components or combinations thereof configured to support the subject matter described herein. The control module 202 may include one or more processors, central processing units (CPUs), graphics processing units (GPUs), controllers, microprocessors, microcontrollers, processing cores and/or other computing resources. The data storage element (or memory) 204 is coupled to or otherwise accessed by the control module 202, and the data storage element 204 may include any sort of random access memory (RAM), read only memory (ROM), flash memory, magnetic or optical mass storage, or any other suitable configuration of non-transitory short or long term data storage or other non-transitory computer-readable media capable of storing data or other programming instructions for execution by the control module 202. The stored programming instructions, when read and executed by the control module 202, cause the control module 202 to generate a media player 210 that supports performance of the various tasks, functions, and/or processes and the operations of the client device 200 described herein. In some embodiments, the control module 202 is implemented as a "system on a chip" (SoC) that incorporates a hybrid microcontroller with memory, input/output and other features to perform the various processing and other functionality of client device 200, and in which case a separate memory 204 may not be provided.

The media player 210 implements or otherwise provides a media manager 212, a presentation buffer 214, a decoding arrangement 216, and one or more output interfaces 218. As described in greater detail below, the media manager 212 manages the selection of a content delivery source and the media segments requested therefrom, and stores or otherwise maintains the downloaded media segments in the presentation buffer 214. In this regard, the presentation buffer 214 generally represents a temporary data storage for the downloaded media segments, which may be implemented by the control module 202 or by data storage element 204. For example, the presentation buffer 214 may be realized as a first, first out (FIFO) buffer where downloaded media segments are ordered sequentially and deleted or otherwise removed after being retrieved by the decoding arrangement 216. The decoding arrangement 216 decodes or otherwise converts an encoded media segment retrieved from the presentation buffer 214 into corresponding signals provided to the output interface(s) 218 of the client device 200 for reproduction to a viewer or user. For example, the decoding arrangement 216 may include a video decoder to convert encoded video segments into corresponding video signals representative of the imagery for the video portion of a media program, which, in turn, is provided to a display interface 218 for reproducing the imagery on the display device 208. Similarly, the decoding arrangement 216 may also include an audio decoder to convert encoded audio segments into corresponding audio signals representative of the audio portion of the media program, which, in turn, is provided to an audio output interface 218. It should be appreciated that in embodiments where the display device 208 is also utilized for audio reproduction, the audio signals output by the audio decoder may be provided to the display device 208 in conjunction with the video signals output by the video decoder via a common interface 218.

Referring to FIG. 2 with reference to FIG. 1, as described in greater detail below, in exemplary embodiments, the media player 210 and/or media manager 212 downloads or otherwise obtains one or more priority lists 112 along with client-side prioritization rules from a director server 108 via a network 110 to memory 204, and then utilizes the downloaded priority list(s) 228 and prioritization rules 224 to select, identify, or otherwise determine the content delivery source 102, 104, 106 from which encoded media segments should be requested.

Additionally, the media player 210 and/or media manager 212 may also calculate or otherwise determine one or more performance metrics associated with the streaming of the multimedia content 101 and store or otherwise maintain that client-specific performance data 220 in memory 204. The client-specific data 220 in memory 204 may also include user preferences, access rights, subscription information and/or other criteria that may be utilized when selecting a content delivery source. In this regard, the media player 210 and/or media manager 212 may utilize unique client-side heuristics in conjunction with the priority list(s) 228 and client-side prioritization rules 224 when applying a content delivery source selection algorithm to identify a particular content delivery source from which the multimedia content 101 is to be requested. To put it another way, each client device 120, 200 or media player 122, 210 may determine its own unique prioritization of content delivery sources by adjusting a priority list 112 obtained from the director server 108 based on client-specific data 220 in conjunction with the client-side prioritization rules 224. For example, the client-side prioritization rules 224 may prescribe limits or performance benchmarks that must be violated before the priority list 222 obtained from the director server 108 can be modified, and/or the client-side prioritization rules 224 may limit whether an individual client can modify the priority list 222 based on subscription information associated with a user of the client device 120, 200. Thus, only certain clients (e.g., those with higher subscription level and subthreshold performance metrics) may be allowed to reprioritize the content delivery sources 102, 104, 106, while other clients may be constrained to using the priority list 112 from the director server 108 without modification.

Streaming Using Encoded Media Segments

Figure 3:
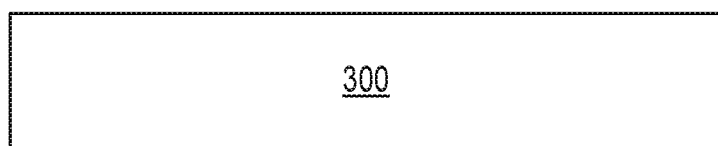
FIG. 3 depicts a schematic representation of a media content file.

FIG. 3 is a schematic representation of an exemplary media content file 300 corresponding to the media program to be streamed (e.g., multimedia content 101), which may be realized as an audio or video program, clip, segment, movie, or the like. The content file 300 may be distributed (e.g., to the origin content server 102) by a publisher or content source for purposes of broadcast or unicast distribution (e.g., via a multimedia streaming system 100). The actual subject matter of the content file 300 (although unimportant for purposes of this description) may comprise a television broadcast, sports event, movie, music, concert, etc. The content file 300 may be live or archived content. The content file 300 may comprise uncompressed video and audio, or alternatively, video or audio. Alternatively, the content file 300 may be compressed using standard or proprietary encoding schemes.

Figure 4:
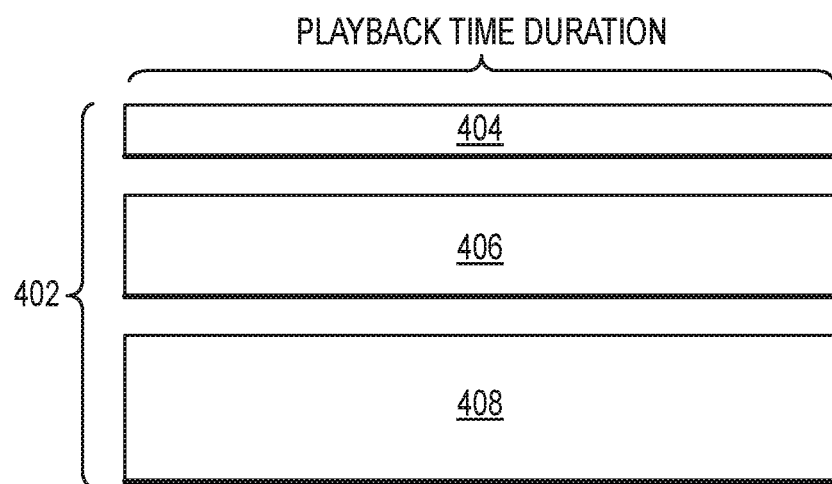
FIG. 4 depicts a schematic representation of media content streams corresponding to the media content file of FIG. 3 in one or more exemplary embodiments.

FIG. 4 is a schematic representation of a plurality of streams 402 having varying degrees of quality and bandwidth to support adaptive bitrate streaming. In one embodiment, the plurality of streams 402 comprises a low quality stream 404, a medium quality stream 406, and a high quality stream 408. Each of the streams 404, 406, 408 represents a copy or a version of the content file 300 (see FIG. 3) encoded and compressed to a different bitrate. For example, the low quality stream 404 may be encoded and compressed to a bitrate of 100 kilobits per second (kbps), the medium quality stream 406 may be encoded and compressed to a bitrate of 200 kbps, and the high quality stream 408 may be encoded and compressed to 600 kbps.

Figure 5:
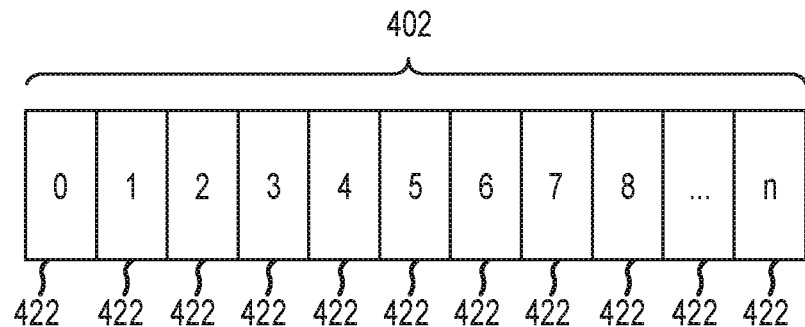
FIG. 5 is a schematic representation of a media content stream divided into a plurality of media segments.

FIG. 5 is a schematic representation of a media content stream 402 divided into a plurality of media segments (or streamlets) 422. As used herein, "media segment" refers to any sized portion of the content file 300. Each media segment 422 may comprise a portion of the content contained in the stream 402, encapsulated as an independent media object (or file), thereby allowing the streamlets 422 to be cached individually and to be independently playable by a media player. The content in a media segment 422 may have a unique time index in relation to the beginning of the content contained in the stream 402. In one embodiment, the content contained in each media segment 422 may have a duration of two seconds. For example, media segment 0 may have a time index of 00:00 representing the beginning of content playback, and media segment 1 may have a time index of 00:02, and so on. Alternatively, the time duration of the media segments 422 may be any duration that is less than the entire playback duration of the content in the stream 402. In a further embodiment, the media segments 422 may be divided according to file size instead of a time index and duration. In the context of a live event where the multimedia content is anchored to a particular point in time for playing the multimedia content, the media segments 422 may be indexed from or otherwise anchored to a particular point in time. The particular media segments 422 of multimedia content of a live event being streamed are played sequentially by a media player according to a schedule of the live event and then subsequently deleted. In practice, the media segments 422 may be stored as separate files on any one or more of the content delivery sources 102, 104, 106 in the multimedia streaming system 100 (e.g., on web servers, proxy caches, or other devices). The separate media segments 422 may be requested by a media player from a selected content delivery source using HTTP. That said, in alternative embodiments, the multimedia content may be stored in a single file that is divided into portions that can be cached using HTTP range requests.

Figure 6:
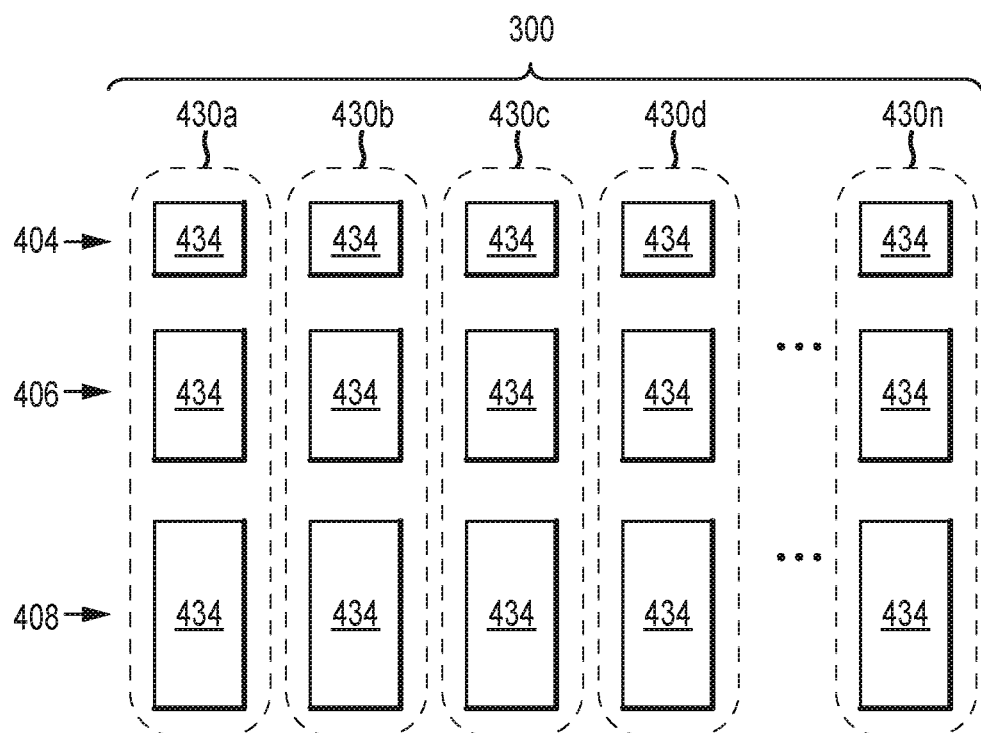
FIG. 6 is a schematic representation of encoded media segments corresponding to the media content streams of FIG. 4 corresponding to the media content file of FIG. 3 which are suitable for delivery in conjunction with the multimedia streaming system of FIG. 1 in one or more exemplary embodiments.

FIG. 6 is a schematic representation of encoded media segments corresponding to the media content file 300. FIG. 6 depicts different sets 430 of media segments, where a "set" refers to a group of media segments having identical time indices and durations but varying bitrates. In the depicted embodiment, the set 430a encompasses all media segments having a time index of 00:00. The set 430a includes encoded media segments 434 having low, medium, and high bitrates (identified by reference numbers 404, 406, 408). Of course, each set 430 may include more than the depicted three bitrates which are given by way of example only. One skilled in the art will recognize that any number of streams having different bitrates may be generated from the original content file 300.

As described above, the duration of one media segment 434 may be approximately two seconds. Likewise, each set 430 may comprise a plurality of media segments 434 where each media segment 434 has a playable duration of two seconds. Alternatively, the duration of a media segment 434 may be predetermined or dynamically variable depending upon a variety of factors including, but not limited to, network congestion, system specifications, playback resolution and quality, etc. In the depicted embodiment, the content file 300 may be collectively formed of the plurality of sets 430. The number of sets 430 may depend on the length of the content file 300 and the length or duration of each media segment 434.

Referring again to FIGS. 1-2, a media player 122, 210 may request portions of the multimedia content 101 by requesting individual segments 434 from a selected content delivery source 102, 104, 106 chosen based on a priority list 112, 222. In some embodiments, the media player 122, 210 requests the segments 434 according to a metadata descriptor file that indicates the current duration of the live multimedia content represented by the available segments 434 to avoid requesting portions of the multimedia content that are not yet available for delivery. For example, the metadata descriptor file timestamp may indicate when the encoding process for a live media program started, and the number of segments 434 available for delivery, from which the media player can determine that the content duration (live playout) and determine to request segments 434 corresponding to the playback of the media program at that duration of time into the program or slightly before that point. In this regard, at times, the schedule of a live event changes, for example, the start time or duration of a live event may be changed in real time, or the timing of when advertisement breaks are scheduled to occur during the live event may change. Thus, the metadata descriptor file may be utilized to provide real-time or near real-time updates (e.g., updated content durations of the multimedia content indicating which portions of the content are available for delivery, advertisement markers for advertisements breaks in the multimedia content, and the like) to media players that are streaming multimedia content of a live event over a pull-based network HTTP to prevent media players from requesting multimedia content that is not yet available for delivery. Examples of how the metadata descriptor file or timeline of the live event can be updated and propagated to media players are described in U.S. patent application Ser. No. 12/508,449, which is incorporated by reference herein in its entirety.

The media manager 212 may receive the streaming multimedia content 101 over the network 110 as a sequence of segments 434 for each of the time indexes of the media program, and then arrange the segments 434 according to the time indexes. The media manager 212 may request and receive the files sequentially in time according to the time indexes, in an order that is not sequential in time, or receive one or more files concurrently. The media manager 212 may decide what segments 434 to request based on any number of given constraints and/or preferences set by, for example, a viewer, the publisher, the web page designer, or constraints or preferences generated within the media player 210 (e.g., staging size or viewing window, the maximum and/or minimum acceptable video quality profile, the available video quality profiles, network performance measures, computational load measures, and the like). The media manager 212 then stages the downloaded segments 434 according to their respective time indexes into a sequence of segments 434 in the presentation buffer 214 in the order in which the segments 434 should be decoded and rendered. As described above in the context of FIG. 2, the staged segments 434 are then sequentially removed from the presentation buffer 214 and provided to the decoding arrangement 216, which converts the encoded media segments 434 into corresponding audiovisual signals provided to the output interface 218 for reproducing the portion and duration of multimedia content 101 corresponding to a respective segment 434 on the display device 208.

Adaptive Content Delivery

Figure 7:
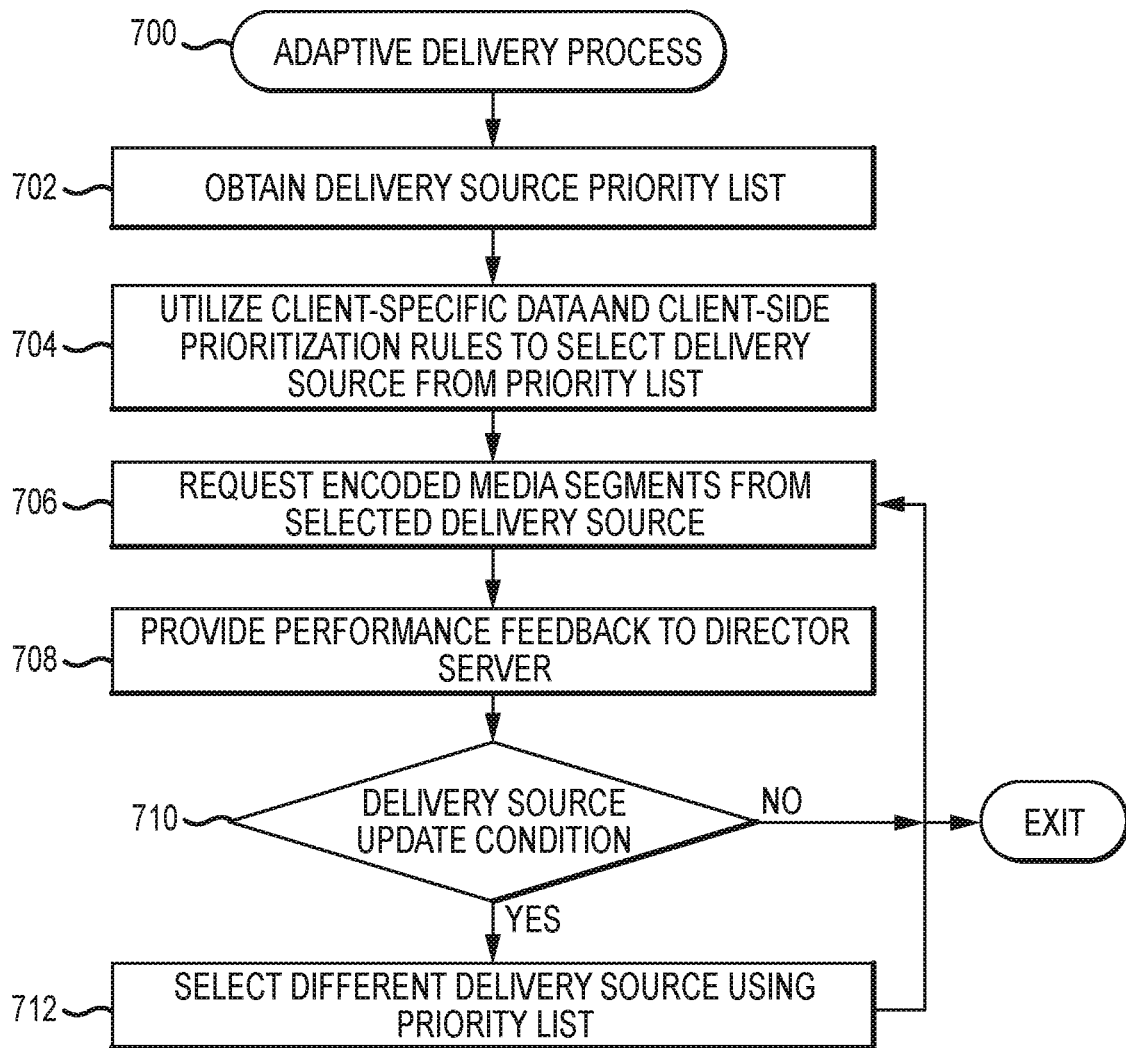
FIG. 7 is a flowchart of an exemplary adaptive delivery process suitable for use with a multimedia streaming system in accordance with one or more embodiments.

FIG. 7 depicts an exemplary embodiment of an adaptive delivery process 700 for intelligently selecting a content delivery source in a multimedia streaming system. The various tasks performed in connection with the illustrated process 700 may be implemented using hardware, firmware, software executed by processing circuitry, or any combination thereof. For illustrative purposes, the following description may refer to elements mentioned above in connection with FIGS. 1-2. In practice, portions of the adaptive delivery process 700 may be performed by different elements of a multimedia streaming system 100. That said, for purposes of explanation, the adaptive delivery process 700 is described here primarily in the context of the director server 108, the client device(s) 120, 200, and the media player(s) 122, 210 executing thereon. It should be appreciated that the adaptive delivery process 700 may include any number of additional or alternative tasks, the tasks need not be performed in the illustrated order and/or the tasks may be performed concurrently, and/or the adaptive delivery process 700 may be incorporated into a more comprehensive procedure or process having additional functionality not described in detail herein. Moreover, one or more of the tasks shown and described in the context of FIG. 7 could be omitted from a practical embodiment of the adaptive delivery process 700 as long as the intended overall functionality remains intact.

In exemplary embodiments, the adaptive delivery process 700 begins by downloading or otherwise obtaining a prioritized list of content delivery sources (task 702). For example, upon startup of a media player 122, 210, the media manager 212 may automatically request a priority list 112 from the director server 108 via the network 110 and store or otherwise maintain the downloaded priority list 222 in memory 204. Alternatively, the media manager 212 may request the priority list 112 from the director server 108 in response to a user indicating a desire to initiate streaming of the multimedia content 101. In yet other embodiments, the director server 108 may automatically push the priority list(s) 112 to media players 122, 210 actively communicating on the network 110 each time the priority list 112 is updated. As described above, in exemplary embodiments, the list of content delivery sources is prioritized based on relative costs, bandwidth, performance, or other metrics or characteristics associated with the respective content delivery sources 102, 104, 106 by applying various source prioritization rules 114 defined by the provider associated with the origin content server 102. In one exemplary embodiment, the source prioritization rules 114 dictate that the origin content server 102 is always last or lowest priority on the list. That said, it will be appreciated that the subject matter described herein is not limited to any particular content delivery source prioritization scheme and there are numerous conceivable ways to prioritize the content delivery sources, the specifics of which are not germane to the inventive subject matter described herein.

In one or more embodiments, the adaptive delivery process 700 continues by utilizing client-specific data or information and client-side prioritization rules to select a content delivery source from a priority list (task 704). In this regard, when the client-side prioritization rules 114, 224 allow for it, the media player 122, 210 and/or the media manager 212 may modify or otherwise adjust the downloaded priority list 112, 222 to account for client-specific historical performance, user preferences, subscription level, and the like to bypass one or more of the highest prioritized content delivery sources on the priority list. For example, the client-side prioritization rules 224 may allow for clients with the highest subscription level to bypass or otherwise skip a content delivery source ranked with a relatively high priority based on that client's prior performance data associated with utilizing that content delivery source, for example, when a performance metric corresponding to prior performance falls below a threshold value for which the client-side prioritization rule 224 allows modification. Thus, when the media player 210 and/or the media manager 212 determines that stored performance data 220 associated with the highest prioritized content delivery source falls below the threshold value that allows the media player 210 and/or the media manager 212 to bypass that content delivery source, the media player 210 and/or the media manager 212 may initially select the second highest prioritized content delivery source from the priority list 112.

In this manner, the initial selection of a content delivery source for streaming from may be influenced by the priority list 112 without a strict correspondence the priority list 112. For example, the initially selected content delivery source may be the highest ranked content delivery source from an applicable priority list 112 having associated performance data 220 that satisfies client-side prioritization criteria 114, 224. Conversely, when the client-side prioritization rules do not allow a particular client to deviate from the provider-supplied priority list, the media player 210 and/or the media manager 212 initially selects the highest prioritized content delivery source for delivering the streaming media. Again, it will be appreciated that the subject matter described herein is not limited to any particular client-side prioritization scheme and there are numerous conceivable ways to augment the prioritization of the content delivery sources on the client side, the specifics of which are not germane to the inventive subject matter described herein.

After utilizing the priority list to select an initial content delivery source, the adaptive delivery process 700 continues by requesting media segments corresponding to the media program to be streamed from that selected content delivery source (task 706). The media player 210 and/or the media manager 212 transmits or otherwise provides, via the network 110, a request message (e.g., an HTTP GET request) to the selected content delivery source that identifies the multimedia content 101 to be delivered. The request message may identify or otherwise include the time index(es) corresponding to the desired media segment(s) to be delivered. In response to receiving the request, the content delivery source locates the requested media segment(s) and transmits or otherwise provides the requested media segment(s) to the requesting media player 210 via the network 110. When the selected content delivery source is a CDN 104, the CDN attempts to locate the requested media segment(s) within one of its caches, and if the requested media segment(s) are not located, requests those media segment(s) from the origin server 102. Similarly, when the selected content delivery source is the RS-DVR network 106, the particular RS-DVR system 162 servicing the request requests those media segment(s) from the origin server 102 and provides them to the requesting media player 210 while also temporarily storing or otherwise maintaining the media segment(s) for servicing multiple live streams, as described in greater detail below in the context of FIGS. 10-12.

Still referring to FIG. 7, in exemplary embodiments, as media segments are downloaded from the selected content delivery source, the adaptive delivery process 700 transmits or otherwise provides performance feedback regarding the selected content delivery source (task 708). In this regard, the requesting media player 210 and/or media manager 212 may calculate or otherwise determine various delivery performance metrics (e.g., the bandwidth or bit rate associated with the stream, the number or rate of missed or dropped packets, and the like) and store or otherwise maintain those performance metrics in association with the selected content delivery source in the memory 204 (i.e., client-specific performance data 220) while also periodically transmitting or otherwise providing those performance metric values to the director server 108 via the network 110. Thus, in some embodiments, the director server 108 may receive substantially real-time performance feedback pertaining to the various content delivery sources currently servicing active media players 122 for use in dynamically updating the priority list(s) 112 to reflect current conditions on the network 110. For example, as performance of one CDN 140, 142 starts to deteriorate, the director server 108 may generate an updated priority list 112 where the priority of that CDN 140, 142 is lower than it was in the preceding iteration of the priority list 112. For example, a first CDN 140 may be initially ranked higher than a second CDN 142, but as performance associated with the first CDN 140 deteriorates, the second CDN 142 may be reprioritized ahead of the first CDN 140 as dictated by applying the source prioritization rules 114 to the real-time (or most current) performance of the CDNs 140, 142. In this regard, the director server 108 may periodically analyze the prioritization factors associated with each of the CDNs 104 and the RS-DVR network 106 to dynamically update the priority list 112 that is influenced by the real-time performance of the CDNs 104 and the RS-DVR network 106.

The adaptive delivery process 700 continues requesting media segments from a selected content delivery source and providing performance feedback until a delivery source update condition is detected or otherwise identified (task 710). In the illustrated embodiment, in response to a delivery source update condition, the adaptive delivery process 700 selects or otherwise identifies a different content delivery source from which to request media segments (task 712), and then repeats the tasks of requesting media segments from that different content delivery source and providing corresponding download performance feedback to the director server (tasks 706, 708). In this regard, a delivery source update condition represents a condition with respect to streaming of the multimedia content to a particular client device 120 or with respect to performance of the content delivery sources on the network 110 for which use of another content delivery source may be desirable.

For example, in one embodiment, the media player 210 and/or the media manager 212 detects or otherwise identifies a delivery source update condition when the current download performance associated with the selected content delivery source indicates that the presentation buffer 214 will be empty (e.g., buffer underrun), or when the selected content delivery source fails to reliably provide a user-requested bitrate of multimedia content 101. Thus, while adaptive bitrate streaming may be employed by the media player 210 and/or the media manager 212 to ensure continuous presentation of the multimedia content 101, the media player 210 and/or the media manager 212 may automatically detect or otherwise identify a condition when streaming from a different content delivery source should be attempted to achieve a desired level of performance. In response to detecting a delivery update condition, the media player 210 and/or the media manager 212 automatically identifies or otherwise selects a different content delivery source from the priority list 222, for example, by selecting the highest ranked content delivery source other than the one that was initially selected. In this regard, if the media player 210 and/or the media manager 212 initially bypassed the highest priority content source dictated by the provider-side prioritization rules, the media player 210 and/or the media manager 212 may revert back to using the default prioritization from the provider. That said, in other embodiments, when selecting a different content source, the media player 210 and/or the media manager 212 may also utilize client-specific data 220 and client-side prioritization rules in a similar manner as described above (e.g., task 704). In this manner, a media player 210 and/or media manager 212 may autonomously modify the delivery source for the streaming on a client-by-client basis to achieve a particular desired level of performance for that particular client.

In another embodiment, the media player 210 and/or the media manager 212 detects or otherwise identifies a delivery source update condition in response to receiving an updated priority list 112 from the director server 108. For example, in some embodiments, when the director server 108 dynamically generates an updated priority list 112, the director server 108 may automatically push or otherwise transmit the updated priority list 112 via the network 110 to each active media player 122 to ensure the updated prioritization is effectuated immediately. Thus, in such embodiments, when an updated priority list 112 becomes available, the media player 210 and/or the media manager 212 may automatically begin attempting to request media segments from the highest ranked content delivery source according to the updated priority list 112. Additionally, the media player 210 and/or the media manager 212 may also utilize client-specific data 220 and client-side prioritization rules in a similar manner as described above (e.g., task 704) to select or otherwise identify a particular content delivery source from among the updated priority list 112. In this manner, the provider may dynamically influence the content delivery source(s) being utilized by active media players 122 via the updated priority list 112 that accounts for changes in network conditions, RS-DVR bandwidth availability, relative costs or bandwidth utilization associated with the CDNs 104, and the like.

It should be noted that the loop defined by tasks 706, 708, 710 and 712 may repeat throughout streaming of multimedia content 101 to seamlessly move between content delivery sources and achieve a desired utilization of delivery resources on the network 110 in a manner that is influenced or otherwise regulated by the provider while also being substantially imperceptible to users of the client devices 120. In this regard, whenever a media player 210 encounters difficulty during streaming, the media player 210 may automatically move between content delivery sources using the most up-to-date provider prioritization of content delivery sources (e.g., by refreshing or otherwise requesting the most recent priority list 112 from the director server 108) while also implementing client-side intelligence or heuristics in conjunction with historical performance data as allowed by the client-side prioritization rules 114 specified by the provider. Additionally, whenever conditions on the network 110 are such that certain content delivery sources become more or less desirable, the relative desirability may be reflected in an updated priority list 112 pushed to active media players 122, 210 to initiate reallocation of streaming requests among the available content delivery sources 102, 104, 106.

FIG. 8 depicts an exemplary embodiment of an origin delivery process 800 suitable for implementation in a multimedia streaming system. The origin delivery process 800 may be performed concurrently to the adaptive delivery process 700 of FIG. 7, and may be done so either independently of or integrated with the adaptive delivery process 700. The various tasks performed in connection with the illustrated process 800 may be implemented using hardware, firmware, software executed by processing circuitry, or any combination thereof. For illustrative purposes, the following description may refer to elements mentioned above in connection with FIGS. 1-2. In practice, portions of the origin delivery process 800 may be performed by different elements of a multimedia streaming system 100. That said, for purposes of explanation, the origin delivery process 800 is described here primarily in the context of the director server 108, the client device(s) 120, 200, and the media player(s) 122, 210 executing thereon. It should be appreciated that the origin delivery process 800 may include any number of additional or alternative tasks, the tasks need not be performed in the illustrated order and/or the tasks may be performed concurrently, and/or the origin delivery process 800 may be incorporated into a more comprehensive procedure or process having additional functionality not described in detail herein. Moreover, one or more of the tasks shown and described in the context of FIG. 8 could be omitted from a practical embodiment of the origin delivery process 800 as long as the intended overall functionality remains intact.

Referring to FIG. 8 with continued reference to FIGS. 1-2, in exemplary embodiments, the origin delivery process 800 is performed by a media player 210 to temporarily obtain media segments from the origin content server 102 on a limited basis. In some embodiments, the origin delivery process 800 is concurrent to, and to some extent overrides or otherwise augments the adaptive delivery process 700 when the origin content server 102 is prioritized last on the priority list 112 (or in some embodiments, removed from the priority list 112 entirely). Expressed another way, in such embodiments, when a media player 210 determines media segments should be requested from the origin content server 102, the origin delivery process 800 effectively overrides the adaptive delivery process 700 for the limited duration of time during which the origin content server 102 is servicing requests from the media player 210. In other embodiments, the origin delivery process 800 may be invoked or performed whenever the adaptive delivery process 700 results in a media player 210 requesting multimedia content 101 directly from the origin content server 102, in other words, portions of the origin delivery process 800 may be integrated with the adaptive delivery process 700.

In the illustrated embodiment, the origin delivery process 800 detects or otherwise identifies an adverse condition with respect to downloading or presenting the streaming multimedia content, and in response to the adverse condition, initiating requests for media segments from the origin content server (tasks 802, 804). In one or more embodiments, the media player 210 and/or the media manager 212 detects or otherwise identifies the adverse condition when the presentation buffer 214 does not include any media segments corresponding to the desired multimedia content 101. This may happen, for example, in response to initiating streaming of the multimedia content 101 (e.g., upon startup, when changing between media programs or channels, etc.) or when an unexpected condition exists on the network 110 for which adaptive bitrate streaming from a previously selected content delivery source cannot prevent buffer underrun. In some embodiments, the media player 210 and/or the media manager 212 also detects an adverse condition midstream when the current download bitrate from a previously selected content delivery source indicates that buffer underrun is likely based on the current contents of the presentation buffer 214. In response to detecting an adverse condition, the media player 210 and/or the media manager 212 automatically transmits one or more request messages (e.g., an HTTP GET request) for media content 101 to the origin content server 102 regardless of its ranking in the priority list 112. As described above, request message(s) identifies the multimedia content 101 to be delivered along with the time index(es) corresponding to the desired media segment(s) to be delivered.

In response to receiving the request, the origin content server 102 locates the requested media segment(s) for the multimedia content 101 and transmits or otherwise provides the requested media segment(s) to the requesting media player 210 via the network 110. In an exemplary embodiment, when responding to requests for encoded media segments, the origin content server 102 modifies the transport layer protocol for the packets corresponding to the response messages containing the requested encoded media segment(s) that are being transmitted to the requesting media player 210 via the network 110. In this regard, the transport layer protocol encoding of the packets corresponding to the requested media segments reduces the likelihood of those packets being dropped, lost, or delayed by intervening components on the network 110. For example, when using TCP, the origin content server 102 may increase the TCP receive window size and/or adjust, alter, modify, or vary any other configurable aspect of the TCP/IP protocol or other applicable communications protocols when sending the requested media segments over the network 110. As a result, delivery of the requested portion(s) of the multimedia content 101 is likely to be successful, however, at the added costs of decreased utilization of bandwidth and computing resources of the origin content server 102 for other tasks (e.g., responding to requests from CDNs 104 or the RS-DVR network 106).

Still referring to FIG. 8, the origin delivery process 800 detects or otherwise identifies a normal delivery condition, and in response, utilizes the priority list to select another content delivery source and resumes requesting subsequent media segments from that selected content delivery source (tasks 806, 808, 810). In one embodiment, the media player 210 and/or media manager 212 detects a normal delivery condition when the presentation buffer 214 is full, or alternatively, when the amount of data or content in the presentation buffer 214 is greater than a threshold amount (e.g., when the duration of playback corresponding to the encoded media segments in the presentation buffer 214 exceeds a threshold amount of time). In this manner, the media player 210 and/or media manager 212 may automatically revert to using a relatively lower cost (or higher priority) content delivery source once sufficient data has been downloaded from the origin content server 102 to be likely ensure a satisfactory user experience during the transition.

Additionally or alternatively, the media player 210 and/or media manager 212 detects a normal delivery condition when the duration of time for which the media player 210 and/or media manager 212 has been requesting content from the origin content server 102 is greater than a timeout period associated with the origin content server 102 servicing requests. Thus, the media player 210 and/or media manager 212 may be restricted or otherwise limited when requesting content from the origin content server 102 to prevent disproportionate allocation of the resources of the origin content server 102 to servicing individual clients. In some embodiments, the origin content server 102 may also implement a timeout period for responding to particular clients on the server side (e.g., by failing to respond to requests from a particular media player after the timeout period has elapsed). Additionally or alternatively to the timeout period, a normal delivery condition may also be detected when a number of requests provided to the origin content server 102 exceeds a threshold number of requests.

The loop defined by tasks 804 and 806 may repeat until either the media player 210 and/or media manager 212 is able to sufficiently fill the presentation buffer 214 with media segments downloaded from the origin content server 102 or the timeout period for requesting content from the origin content server 102 has expired, whichever comes first. Thereafter, the media player 210 and/or media manager 212 utilizes the downloaded priority list 222 or requests an updated priority list 112 from the director server 108, and then selects or otherwise identifies a CDN 104 or the RS-DVR network 106 as the content delivery source for servicing subsequent requests in a manner that is influenced by the priority list 112, 222 in a similar manner as described above (e.g., task 704). The media player 210 and/or media manager 212 then resumes transmitting request messages, to the selected content delivery source 104, 106, for the media segments that follow the sequence of media segments downloaded from the origin content server 102. The media player 210 and/or media manager 212 maintains requesting media segments from that selected content delivery source 104, 106 until either a delivery source update condition is identified (e.g., task 710) or another adverse condition (e.g., task 802) is detected.

It should be noted that the origin delivery process 800 allows a media player 210 to reliably receive portions of desired multimedia content 101 from the origin content server 102 for a limited amount of time to ensure a satisfactory viewer experience before reverting to the dynamic and intelligent prioritized selection of a servicing content delivery source described above in the context of FIG. 7. For example, when a viewer wants to begin watching a particular media program or changes from one media program to a new media program, the media player 210 may request enough media segments for that media program from the origin content server 102 to minimize the amount of lag or delay in presenting the media program to the viewer (e.g., the lag behind live time) before seamlessly transitioning to streaming the remainder of the media program from other available content delivery sources with a lower associated costs. Additionally, when buffer underrun occurs or appears likely, the media player 210 automatically revert to requesting media segments from the origin content server 102 to prevent interruption on the display device 208 (e.g., a pause or delay in playback) before reverting back to streaming the media program from other available content delivery sources.

Figure 9:
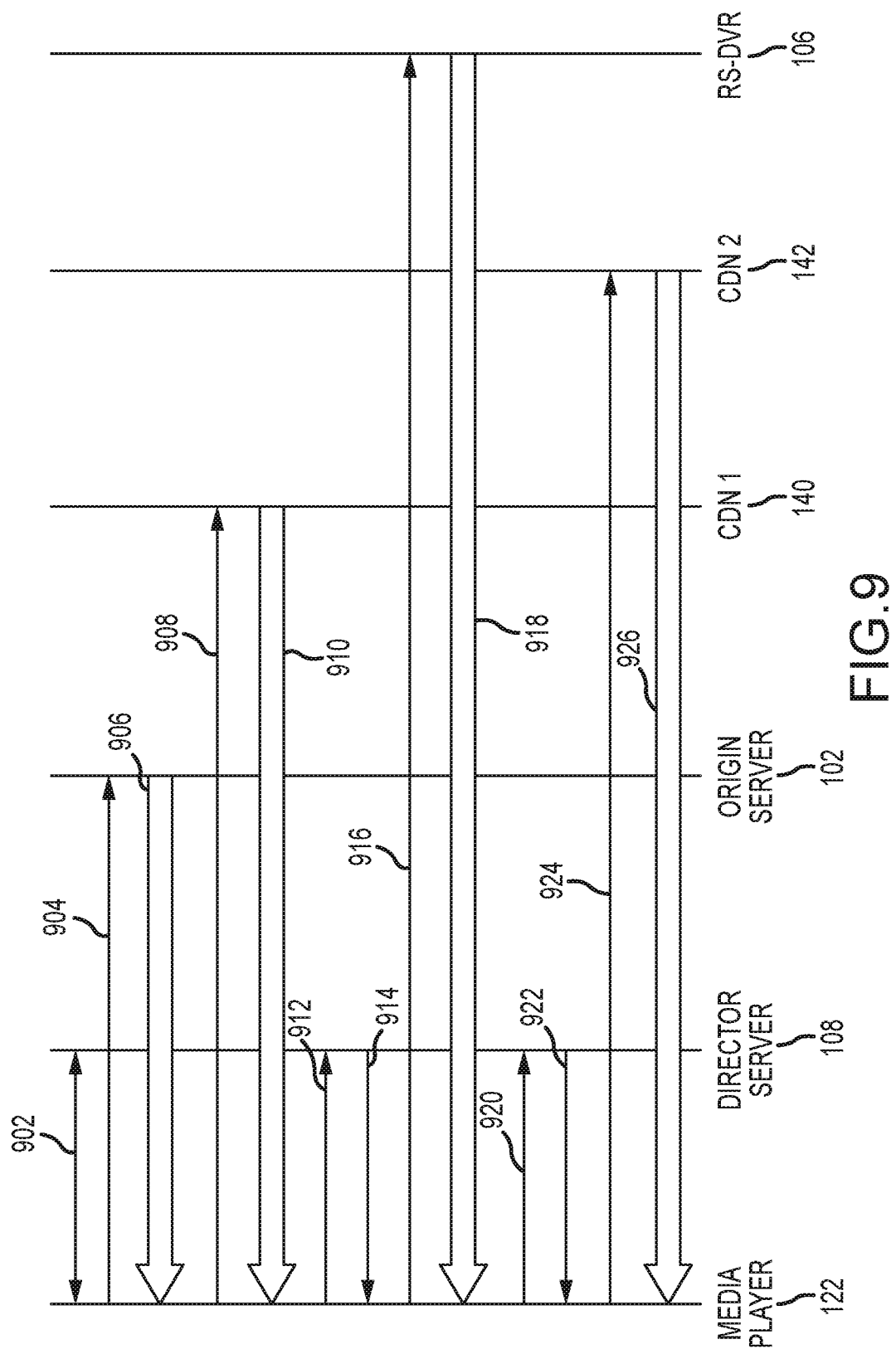
FIG. 9 is a diagram illustrating a sequence of communications within the multimedia streaming system of FIG. 1 in accordance with one exemplary embodiment of the adaptive delivery process of FIG. 7 in conjunction with the origin delivery process of FIG. 8.

FIG. 9 depicts an exemplary sequence 900 of communications within the multimedia streaming system 100 of FIG. 1 in conjunction with the adaptive delivery process 700 of FIG. 7 and the origin delivery process 800 of FIG. 8 in accordance with one or more exemplary embodiments. The illustrated sequence 900 begins with a media player 122 communicating 902 with the director server 108 via the network 110 to download or otherwise obtain a current priority list 112 (e.g., task 702). For example, the media player 122 may request a content delivery source priority list 112 from the director server 108 upon startup or prior to starting a stream of multimedia. Additionally, in some embodiments, the media player 122 may also download or obtain client-side prioritization rules 114 for use in performing client-specific adjustments to the delivery source prioritization.

The illustrated sequence 900 depicts a scenario where the media player 122 detects an adverse condition with respect to streaming the desired multimedia content 101 (e.g., task 802), and in response, the media player 122 transmits requests 904 for the most recent encoded segments of the multimedia content 101 (e.g., based on a timeline for the live event) to the origin server 102 (e.g., task 804). In response to the request from the media player 122, the origin server 102 transmits the requested encoded media segments 906 to the requesting media player 122 via the network 110. As described above, in exemplary embodiments, the origin server 102 modifies the transport layer protocol when providing the requested media segments 906 to increase the likelihood of successful delivery by the network 110.

In response to determining that the presentation buffer has been filled or that a timeout period for requesting content from the origin server 102 has been met (e.g., task 806), the media player 122 utilizes the downloaded priority list 112 and any applicable client-side prioritization rules 224 to select or otherwise identify a first CDN 140 as the highest ranked content delivery source within the multimedia streaming system 100 for servicing the media player 122 (e.g., tasks 704, 808). The media player 122 then transmits requests 908 to the first CDN 140 for the encoded segments of the multimedia content 101 that follows those previously obtained from the origin server 102 in the presentation sequence (e.g., tasks 706, 810). The media player 122 receives the requested encoded multimedia segments 910 from the first CDN 140 and stages them in the presentation buffer. As described above, the media player 122 calculates or otherwise determines various delivery performance metrics associated with the streaming 910 from the first CDN 140 and transmits or otherwise provides those delivery performance metrics 912 to the director server 108 (e.g., task 708).

In the illustrated embodiment, the director server 108 utilizes the real-time streaming performance data associated with the first CDN 140 obtained from the media player 122 along with streaming performance data and other prioritization factors associated with the other content delivery sources within the multimedia streaming system 100. For example, other media players 122 may be concurrently providing the director server 108 with streaming performance data associated with the first CDN 140 along with other CDNs 104 or the RS-DVR network 106. Using the real-time performance data, the director server 108 may calculate or otherwise determine the relative performance and utilization of the content delivery sources 104, 106. Additionally, the RS-DVR manager 160 may provide feedback to the director server 108 regarding the current bandwidth utilization associated with the RS-DVR network 106 (or alternatively, the amount of available bandwidth on the RS-DVR network 106). Based on the performance and utilization data, along with relative costs and other prioritization factors, the director server 108 may dynamically update the priority list 112 to reflect current conditions on the network 110, and push or otherwise transmit 914 the updated priority list 112 to the active media players 122.

Still referring to FIG. 9, the illustrated sequence 900 depicts a scenario where the updated priority list 112 indicates, to the media player 122, that the RS-DVR network 106 (or alternatively, a particular RS-DVR 162) should be ranked higher than the first CDN 140 after accounting for the client-specific performance data or prioritization rules. For example, as the amount of available backhaul bandwidth associated with the RS-DVR network 106 increases, the director server 108 may increase the ranking (or priority) of the RS-DVR network 106 because the costs of using that available backhaul bandwidth are less than the costs of using a third-party CDN 104. In response to receiving 914 the updated priority list 112 (e.g., task 710), the media player 122 may utilize the updated priority list 112 to select or otherwise identify the RS-DVR network 106 as the new highest ranked content delivery source within the multimedia streaming system 100 for servicing the media player 122 (e.g., task 712). Thereafter, the media player 122 transmits 916 requests to the RS-DVR manager 160 and/or a particular RS-DVR system 162 for the next encoded segments of the multimedia content 101 in the presentation sequence, receives 918 the requested encoded multimedia segments 910 from an RS-DVR system 162, and transmits 920 corresponding delivery performance metrics associated with the RS-DVR network 106 and/or the servicing RS-DVR system 162 to the director server 108.

As described in greater detail below in the context of FIGS. 10-12, depending on the embodiment, the media player 122 may request the encoded media segments directly from a particular RS-DVR system 162, or alternatively, may request them indirectly via the RS-DVR manager 160. For example, in some embodiments, the RS-DVR manager 160 may balance or otherwise manage the utilization of the RS-DVR systems 162. In such embodiments, the RS-DVR manager 160 may receive a request from the media player 122 and determine which RS-DVR system 162 should service the request (e.g., based on the available bandwidth of the RS-DVR system 162, the geographic location or distance on the network 110 between the RS-DVR system 162 and the client device 120 associated with the media player 122, and the like). The RS-DVR manager 160 then either redirects the request to the identified servicing RS-DVR system 162 for servicing the request, or alternatively, provides indication of the identified servicing RS-DVR system 162 to the media player 122. That said, in alternative embodiments, the features and functionality of the RS-DVR manager 160 may be incorporated in the director server 108. In some of those embodiments, rather than prioritizing the RS-DVR network 106 collectively and then using the RS-DVR manager 160 to manage utilization of the RS-DVR systems 162, the director server 108 may receive bandwidth utilization information for each of the individual RS-DVR systems 162 as well as their associated geographic locations, and then prioritize or rank each RS-DVR system 162 individually amongst the CDNs 104.

Still referring to FIG. 9, the illustrated sequence 900 depicts a scenario where the director server 108 dynamically updates the priority list 112 to reflect that the amount of available backhaul bandwidth on the RS-DVR network 106 (or alternatively, the available bandwidth of the RS-DVR system 162 currently servicing the media player 122) has fallen below a threshold amount for maintaining satisfactory performance of the RS-DVR network 106 and/or the servicing RS-DVR system 162 with respect to playback of recorded multimedia content to other subscribers or users. Additionally, in the illustrated sequence 900, the current conditions on the network 110 also dictate that a second CDN 142 should now be ranked higher than the first CDN 140. Thus, in response to receiving 922 the updated priority list 112, the media player 122 may utilize the updated priority list 112 to select or otherwise identify the second CDN 142 as the new highest ranked content delivery source within the multimedia streaming system 100 for servicing the media player 122. Thereafter, the media player 122 transmits 924 requests for the next encoded segments of the multimedia content 101 to the second CDN 142 and receives 926 the requested encoded multimedia segments 910 from the second CDN 142 via the network 110.

Although not illustrated in FIG. 9, it should be noted that at any time during the sequence 900, if the media player 122 identifies an adverse presentation condition (e.g., a sufficiently low or empty presentation buffer, a logical channel change or other change in the multimedia content to be streamed, or the like), the media player 122 may automatically revert to temporarily requesting encoded media segments from the origin content server 102. Thereafter, the media player 122 may return to adhering to the current priority list 112, as described above.

Live Content Delivery Using RS-DVR

Figure 10:
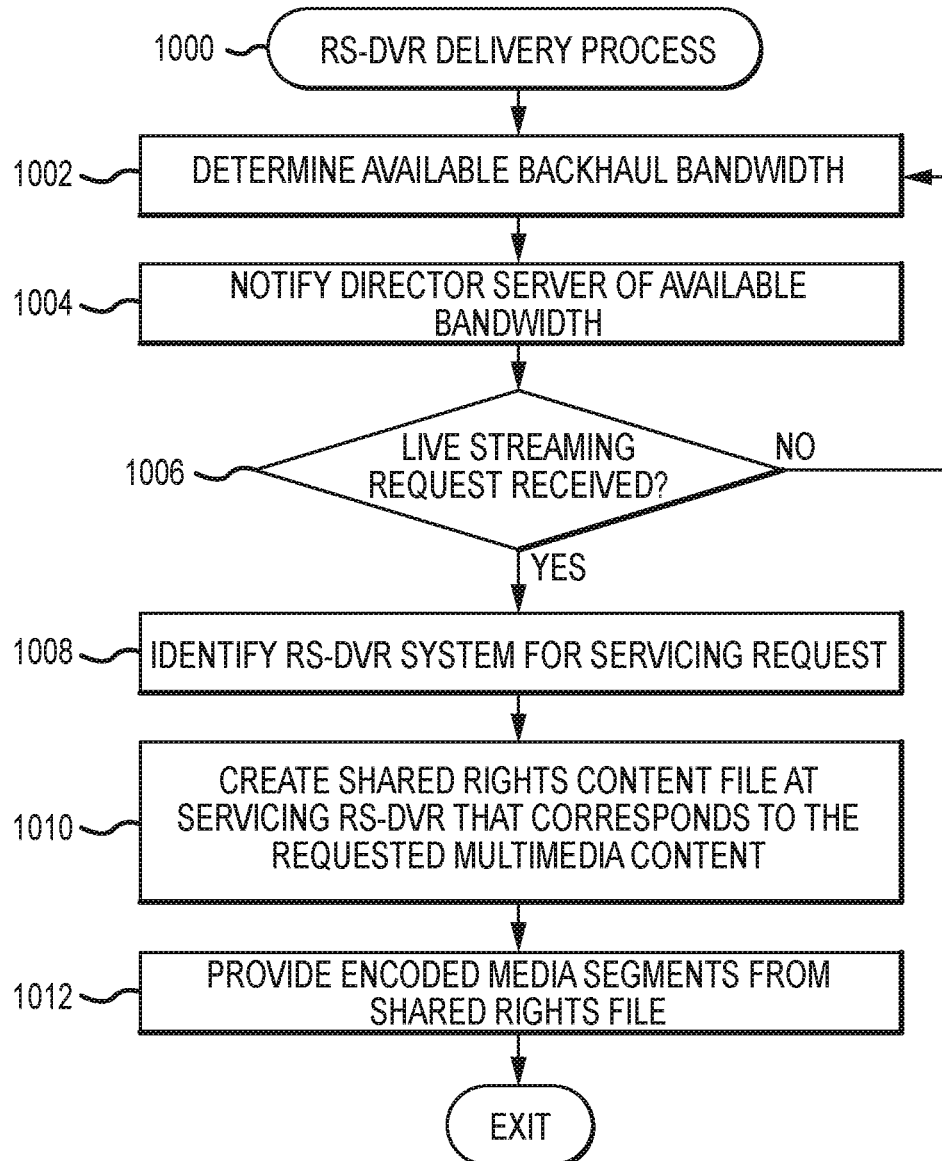
FIG. 10 is a flowchart of an exemplary remote storage digital video recorder (RS-DVR) delivery process suitable for use with a multimedia streaming system in accordance with one or more embodiments.

FIG. 10 depicts an exemplary embodiment of a RS-DVR delivery process 1000 suitable for implementation in a multimedia streaming system. The RS-DVR delivery process 1000 may be performed in conjunction with the adaptive delivery process 700 of FIG. 7, for example, when the prioritization of content delivery sources results in one or more media players 122 requesting multimedia content from the RS-DVR network 106. The various tasks performed in connection with the illustrated process 1000 may be implemented using hardware, firmware, software executed by processing circuitry, or any combination thereof. For illustrative purposes, the following description may refer to elements mentioned above in connection with FIGS. 1-2. In practice, portions of the RS-DVR delivery process 1000 may be performed by different elements of a multimedia streaming system 100. That said, for purposes of explanation, the RS-DVR delivery process 1000 is described here primarily in the context of the RS-DVR manager 160 and the RS-DVR system(s) 162 of the RS-DVR network 106. It should be appreciated that the RS-DVR delivery process 1000 may include any number of additional or alternative tasks, the tasks need not be performed in the illustrated order and/or the tasks may be performed concurrently, and/or the RS-DVR delivery process 1000 may be incorporated into a more comprehensive procedure or process having additional functionality not described in detail herein. Moreover, one or more of the tasks shown and described in the context of FIG. 10 could be omitted from a practical embodiment of the RS-DVR delivery process 1000 as long as the intended overall functionality remains intact.

The illustrated RS-DVR delivery process 1000 begins by calculating or otherwise determining the available backhaul bandwidth and notifying the director server of the amount of available backhaul bandwidth (tasks 1002, 1004). In this regard, the RS-DVR manager 160 may monitor or otherwise track the status and capacity of one or more RS-DVR systems 162. For example, an RS-DVR manager 160 may support a "cluster group" of RS-DVR systems 162 that are physically located together at a particular data center, where the RS-DVR manager 160 assigns the individual RS-DVR systems 162 to recording specific channels or programs corresponding to various recording requests as a function of available capacity and current (and future scheduled) loads on the individual RS-DVR systems 162. In this capacity, the RS-DVR manager 160 may also identify or otherwise determine the current bandwidth utilization associated with the RS-DVR systems 162, and from there, determine the amount of available backhaul bandwidth associated with the RS-DVR cluster group (i.e., the difference between the allocated backhaul bandwidth and the current utilization).

The RS-DVR manager 160 may then transmit or otherwise provide an indication of the amount of available backhaul bandwidth to the director server 108, which, in turn, utilizes the amount of available backhaul bandwidth to rank or otherwise prioritize the RS-DVR network 106 relative to the other available content delivery sources. For example, the provider-side prioritization rules 114 may dictate that the RS-DVR network 106 should be ranked ahead of one or more CDNs 104 when the amount of available backhaul bandwidth exceeds a threshold value, and below those CDNs 104 when the amount of available backhaul bandwidth is less than the threshold value. In this example, the threshold value may be chosen to provide a bandwidth buffer for playback of recorded content, so that the RS-DVR network 106 can maintain satisfactory user experience with respect to those users viewing recorded content while also being able to accommodate some transient fluctuations in backhaul bandwidth demand with respect to playback of recorded content while concurrently supporting live streaming. Moreover, in some embodiments, the director server 108 may remove the RS-DVR network 106 from a priority list 112 when the available backhaul bandwidth is less than a second threshold value to prevent burdening the RS-DVR network 106 with live streaming responsibilities. It should be noted that in embodiments without an RS-DVR manager 160, each individual RS-DVR system 162 may transmit or otherwise provide indication of its current utilization to the director server 108 independently, which in turn, may rank the RS-DVR systems 162 individually rather than collectively.

Thereafter, the RS-DVR delivery process 1000 continues by receiving a request for encoded media segments pertaining to live multimedia content from a media player (task 1006). For example, when the RS-DVR network 106 is prioritized higher than the CDNs 104, one or more of the media players 122 may request segments of the multimedia content 101 from the RS-DVR network 106 rather than the CDNs 104. In embodiments featuring a RS-DVR manager 160, the RS-DVR delivery process 1000 identifies or otherwise determines an individual RS-DVR system for servicing the request (task 1008). In this regard, requests may be transmitted by a media player 122 to the RS-DVR manager 160 managing a particular RS-DVR cluster group having available backhaul bandwidth. The RS-DVR manager 160 then analyzes the current and/or anticipated capacity of the RS-DVR systems 162 of the group and assigns the request to an individual RS-DVR system 162 of the group that is likely to have sufficient capacity for handling the request. For example, the RS-DVR manager 160 may assign requests for streaming the multimedia content 101 to the RS-DVR system 162 of its group having the most available bandwidth, the fewest current and/or scheduled recordings, or the like. That said, in embodiments without a RS-DVR manager 160, the RS-DVR system 162 for servicing the requests may be identified by the media player 122 based on the priority list 112 and transmit requests to that particular RS-DVR system 162 that was more highly ranked by the director server 108.

Upon receiving a request pertaining to streaming live multimedia content, the RS-DVR delivery process 1000 continues by creating a shared rights content file corresponding to the requested multimedia content and providing encoded media segments from the shared rights content file to the requesting media player (tasks 1010, 1012). In this regard, the RS-DVR 162 receiving the request begins downloading or otherwise obtaining the most recent encoded media segments of the multimedia content 101 and creates a local representation of the content file containing sets of downloaded encoded media segments at different bitrates (e.g., content file 300 in FIG. 7). The content file for streaming the live multimedia content 101 is designated or otherwise assigned shared access rights, so that encoded media segments from the content file may be provided to multiple media players, as described in greater detail below. The shared rights content file may be stored or otherwise maintained in a temporary data storage element, such as, for example, a FIFO buffer or the like, so that the encoded media segments do not persist at the RS-DVR system 162 beyond a certain point in time and only a certain amount (or duration) of the most recent encoded media segments of the multimedia content 101 is capable of being stored in the buffer residing at the RS-DVR system 162. The RS-DVR system 162 then transmits the encoded media segments from the shared rights content file to the requesting media player 122 via the network. After delivering the requested media segments from the shared rights content file, those segments may eventually be deleted from the RS-DVR system 162, for example, by evicting them from the buffer.

In exemplary embodiments, the RS-DVR system 162 marks or otherwise designates the encoded media segments being transmitted for streaming substantially in real-time as cacheable, as compared to individually allocated recorded multimedia content which may be designated as non-cacheable to limit availability to individual subscribers. Additionally, to improve delivery over the network 110, the RS-DVR system 162 may also modify the transport layer protocol in a similar manner as described in the context of the origin content server 102 when transmitting the encoded media segments to increase the likelihood of successful delivery and reduce the amount of lag behind live with respect to the presentation of the multimedia content 101 on the media player 122. Accordingly, in some embodiments, the RS-DVR system 162 marks or otherwise designates the encoded media segments being transmitted for streaming substantially in real-time as non-cacheable while transmitting them using a modified protocol that increases likelihood of successful delivery to account for lack of caching. The RS-DVR system 162 may also dynamically adjust the delivery route on the network 110 utilized to deliver the media segments to the requesting media player 122, as described in greater detail below.

As noted above, in exemplary embodiments, the content file for the live multimedia content 101 is assigned shared access rights, so that a single RS-DVR system 162 may provide media segments for the live multimedia content 101 to multiple media players 122 concurrently. In this regard, upon receiving a request for streaming live multimedia content 101 that is already being serviced by a particular RS-DVR system 162 in the RS-DVR network 106, the RS-DVR manager 160 may identify that RS-DVR system 162 as the servicing RS-DVR for the content 101 and direct any subsequent requests for the live multimedia content 101 from other media players 122 to that RS-DVR system 162 already servicing the content 101. The RS-DVR system 162 transmits the encoded media segments from the shared rights content file to each of the requesting media players 122 via the network 110 as requested. Again, the delivered media segments may be marked as cacheable and transmitted with a modified transport layer protocol for each of the requesting media players 122 to improve delivery.

It should be noted that in some embodiments, the requests for streaming live multimedia content may be dynamically redirected to other RS-DVR systems 162 within the RS-DVR network 106. For example, as the number of requests for playback of recorded content stored by the RS-DVR system 162 servicing the live multimedia content 101 increases, the RS-DVR manager 160 may dynamically redirect the media players 122 streaming the live multimedia content 101 to another RS-DVR system 162 in the RS-DVR network 106 that is not receiving as many playback requests or otherwise has more available bandwidth. That other RS-DVR system 162 may then create its own shared rights content file, download media segments of the live multimedia content 101 from the origin content server 102, and provide them to the redirected requesting media players 122, thereby freeing up resources associated with the RS-DVR system 162 that was previously servicing the live streaming requests. At the same time, in some embodiments, the RS-DVR system 162 that was previously servicing the live streaming requests may also delete its shared rights content file corresponding to the live multimedia content 101 from its memory.

It should be noted that although the RS-DVR delivery process 1000 may primarily be described herein in the context of live multimedia content, the subject matter is not limited to live multimedia content, and the RS-DVR delivery process 1000 may be similarly performed in the context of VOD content or other shared-rights multimedia content recorded within a preceding time period to support streaming or other CDN-type functionality with respect to requesting media players 122. Additionally, some embodiments of the RS-DVR delivery process 1000 may be configured to allow media players to reliably receive portions of desired multimedia content 101 from the RS-DVR network 106 for a limited amount of time to ensure a satisfactory viewer experience before reverting to the dynamic and intelligent prioritized selection of a servicing content delivery source described above in the context of FIG. 7. In this regard, in some conditions, a media player may effectively default to requesting media content from an RS-DVR system or network to achieve more prompt and reliable delivery of media content rather than utilizing the priority list to select a content delivery source in a similar manner as described above in the context of the origin server and the origin delivery process 800.

For example, in some embodiments, upon initiation of streaming content (e.g., starting viewing a particular media program or channel, changing between media programs or channels, or the like), a media player 122 may initially request media content from the RS-DVR network 106 to facilitate beginning presentation of the media content as quickly as possible and minimize lag behind live time by virtue of the servicing RS-DVR system 162 modifying the transport layer protocol to increase the likelihood of successful delivery. Alternatively, when a previously selected content delivery source fails to deliver requested media content and a media player's presentation buffer becomes depleted, a media player 122 may request the media content from the RS-DVR network 106 to maintain presentation of the media content without buffering delays that could degrade the user experience. Thus, in some embodiments, the RS-DVR network 106 may be prioritized below the origin server 102 (e.g., due to backhaul bandwidth limitations) but function as a content delivery source as last resort in response to initiation of a stream or other adverse conditions.

Figure 11:
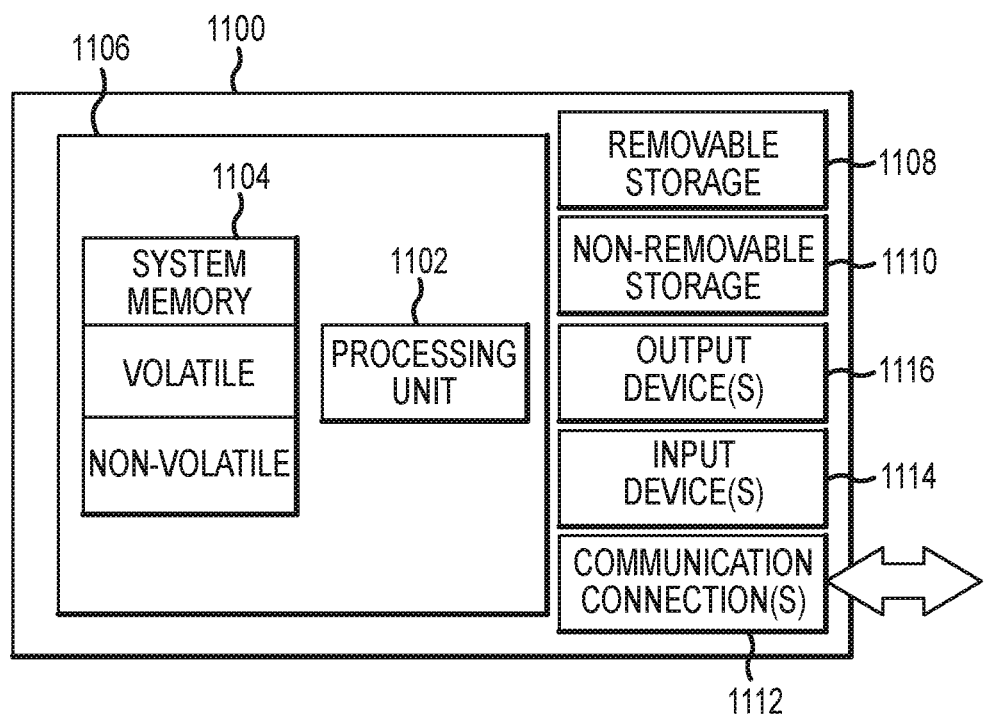
FIG. 11 is a simplified schematic representation of one exemplary embodiment of an RS-DVR system.

FIG. 11 depicts an exemplary embodiment of a RS-DVR system 1100 suitable for use as an RS-DVR system 162 in the multimedia streaming system 100 of FIG. 1. The RS-DVR system 1100 is only one example of a suitable implementation and is not intended to suggest any limitation as to the scope of use or functionality of the RS-DVR systems 162. For example, although the RS-DVR system 1100 is depicted as a unitary component, a practical implementation may include a plurality of physical hardware components that cooperate in a distributed architecture.

The RS-DVR system 1100 and certain aspects thereof may be described in the general context of computer-executable instructions, such as program modules, executed by one or more processors or other devices. Generally, program modules include routines, programs, objects, components, data structures, and/or other elements that perform particular tasks or implement particular abstract data types. Typically, the functionality of the program modules may be combined or distributed as desired in various embodiments.

The RS-DVR system 1100 typically includes at least some form of computer readable media. Computer readable media can be any available media that can be accessed by the RS-DVR system 1100 and/or by applications executed by the RS-DVR system 1100. By way of example, and not limitation, computer readable media may comprise computer storage media that includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the RS-DVR system 1100.

Referring again to FIG. 11, in its most basic configuration, the RS-DVR system 1100 typically includes at least one processing unit 1102 and a suitable amount of memory 1104. The processing unit 1102 and the memory 1104 cooperate to provide the desired functionality, processing logic, and operating intelligence for the RS-DVR system 1100. Depending on the exact configuration and type of RS-DVR system 1100, the memory 1104 may be volatile (such as RAM), non-volatile (such as ROM, flash memory, etc.) or some combination of the two. The RS-DVR system 1100 may also include additional storage (removable and/or non-removable) including, but not limited to, magnetic or optical disks or tape. Such additional storage is illustrated in FIG. 11 by removable storage 1108 and non-removable storage 1110. The memory 1104, the removable storage 1108, and the non-removable storage 1110 are all examples of computer storage media as defined above.

The RS-DVR system 1100 may also contain communications connection(s) 1112 that allow the system 1100 to communicate with other devices on a network (e.g., network 110), such as the RS-DVR manager 160 or the client devices 120 shown in FIG. 1. The RS-DVR system 1100 may also include or communicate with input device(s) 1114 such as a keyboard, mouse or other pointing device, pen, voice input device, touch input device, etc. The RS-DVR system 1100 may also include or communicate with output device(s) 1116 such as a display, speakers, indicator lights, a printer, or the like.

Figure 12:
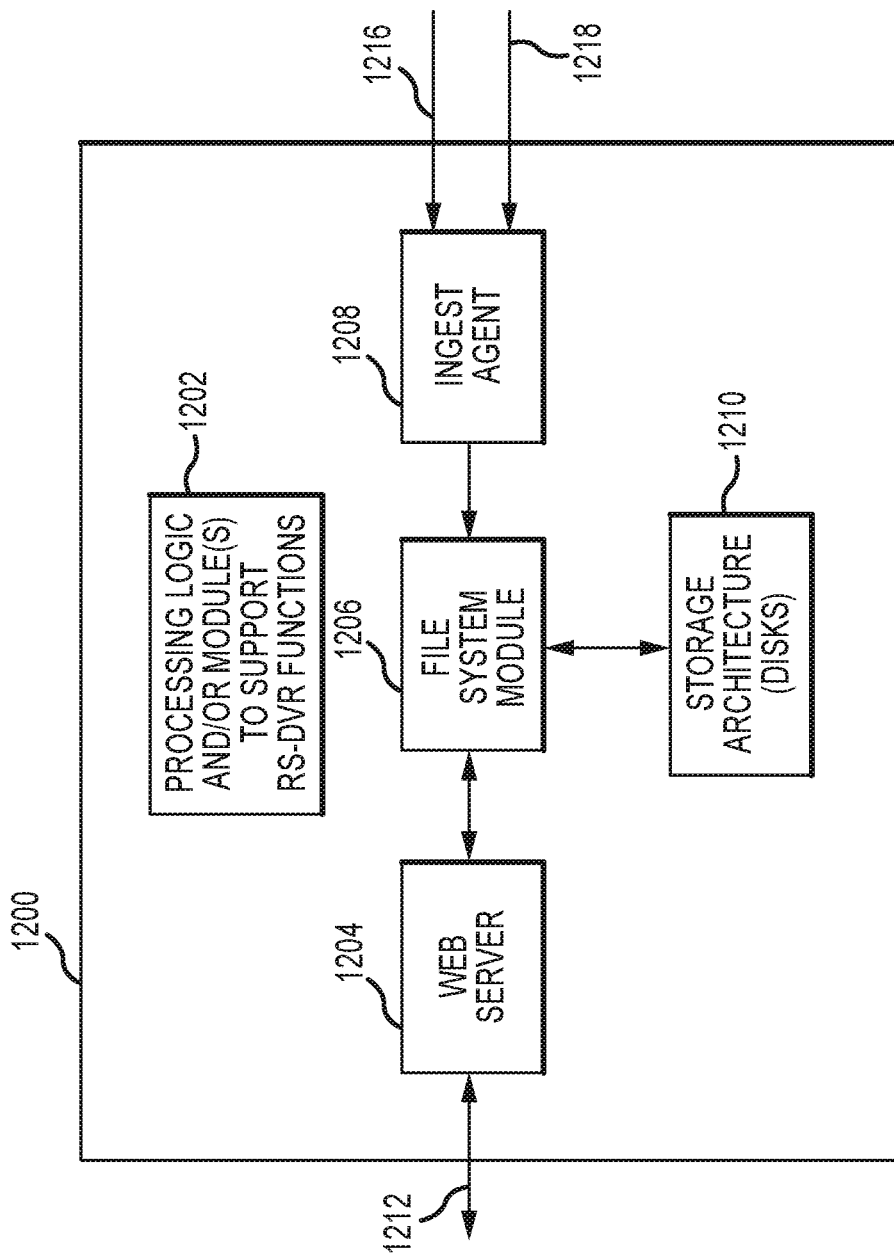
FIG. 12 is a schematic representation of another exemplary embodiment of an RS-DVR system.

FIG. 12 depicts another representation of an exemplary embodiment of an RS-DVR system 1200. FIG. 12 depicts some of the primary logical or functional modules of the RS-DVR system 1200. The illustrated embodiment of the RS-DVR system 1200 generally includes, without limitation: a processing logic module 1202, a network interface (which in this exemplary embodiment is realized as a web server 1204), a file system module 1206, an ingest agent 1208, and a storage architecture 1210 (which in this exemplary embodiment is realized as a plurality of memory storage devices such as hard disk drives). These elements cooperate to support the various functions and operations of the RS-DVR system 1200.

The processing logic module 1202 may cooperate with the web server 1204, the file system module 1206, the ingest agent 1208, and the storage architecture 1210 as needed during operation of the RS-DVR system 1200. Moreover, the processing logic module 1202 may be suitably configured to support one or more designated functions of the RS-DVR system 1200. In this regard, the processing logic module 1202 may include any desired functionality. For example, the processing logic module 1202 may be designed to include a content rights management module, a hard disk monitor module, a diagnostic module, or the like.

The web server 1204 (and/or any suitable network interface) represents hardware, software, firmware, and/or logic that is configured to communicate data between the RS-DVR system 1200 and another component or element such as a subscriber system. Referring to FIG. 1, the web server 1204 can be used to deliver media content to the subscriber systems 120 via the network 110. The arrow 1212 in FIG. 12 represents the data communication link between the web server 1204 and the network 110. In certain embodiments, the web server 1204 cooperates with the file system module 1206 to provide media content files (in the form of encoded media segments) to the subscriber systems 120 in accordance with established HTTP techniques and methodologies.

The file system module 1206 is utilized to manage, organize, and maintain files in the storage architecture 1210. The file system module 1206 can accommodate multiple bitrate encoded media segments that are stored in a distributed manner across a plurality of hard disks of the storage architecture 1210. The file system module 1206 also cooperates with the ingest agent 1208 to accommodate the recording and storage of encoded media segments as needed during the operation of the RS-DVR system 1200. The ingest agent 1208 may be coupled to the file system module 1206 to receive encoded media segments that represent media content files encoded at a plurality of different bitrates. The ingest agent 1208 is capable of receiving multicast delivered media segments 1216 and/or unicast delivered media segments 1218 from an appropriate content source (e.g., the origin content server 102).

The storage architecture 1210 is coupled to the file system module 1206 to store encoded media segments that can be subsequently accessed for playback to one or more subscriber systems. In certain implementations, the storage architecture 1210 includes a plurality of memory storage devices such as hard disk drives. The memory storage devices are physically distinct and separate units that can be removed and replaced as needed. The file system module 1206 governs the manner in which the encoded media segments are stored in the different memory storage devices. The storage architecture 1210 of the RS-DVR system 1200 may include a shared storage architecture to store shared rights media content files, and a per-subscriber storage architecture to store per-subscriber rights media content files. In certain implementations, the shared storage architecture exclusively stores shared rights media content files without storing any per-subscriber rights media content files, and the per-subscriber storage architecture exclusively stores per-subscriber rights media content files without storing any shared rights media content files. Moreover, the shared storage architecture and the per-subscriber architecture are preferably realized as physically distinct and separated hardware devices, e.g., two separate hard disk drives, two separate disk drive enclosures, or the like. In this regard, the shared storage architecture may include buffers or other data storage that supports temporary storage of media segments for purposes of live streaming multimedia content to a plurality of client devices 120 and/or media players 122, as described above. Thus, if the RS-DVR system 1200 determines that a media content file corresponding to live streaming requests should have shared rights, then the media content file is stored in the shared storage architecture of the RS-DVR system 1200. Conversely, recorded media content files may be stored in the per-subscriber storage architecture that exclusively stores media content files having per-subscriber rights. While the recorded media content files can be stored for any amount of time, in one or more embodiments, any shared media content files corresponding to live events are automatically deleted when the live event ends (e.g., there is no more additional multimedia content 101 available from the origin server 102) or in the absence of receiving any streaming requests within a prescribed timeout period.

During operation, the processing logic module 1202, web server 1204, file system module 1206, ingest agent 1208, and storage architecture 1210 cooperate to carry out content recording, content file (media segment) storing, file management, disk management, content playback, and other functions of the RS-DVR system 1200. For the multiple bitrate implementations described herein, these elements of the RS-DVR system 1200 cooperate to provide stored media segments to the client devices 120 for presentation using at least one of the plurality of different available bitrates.

As described above, in exemplary embodiments, the multimedia streaming system 100 supports adaptive rate (or multiple bitrate) digital media content. Accordingly, the RS-DVR systems 162 are preferably configured to support the multiple bitrate scheme by recording a plurality of encoded video bit rates. In certain implementations, each subscriber has only one copy of the recorded content because the various bit rate versions of the same content are stored together in one logical file. As with traditional adaptive rate approaches, the video is split up into multi-second "media segments" and retrieved as HTTP objects.

The adaptive rate RS-DVR system 162 can be implemented as a specialized web server that records and retrieves video files on behalf of any number of subscriber systems 120. The RS-DVR system 162 receives video from the origin content server 102 or live stream encoders via either a multicast of the encoded media segments or via an HTTP GET request methodology. The RS-DVR system 162 then immediately makes as many copies of the video as there are subscribers requesting to record the channel. Each subscriber has, in effect, their own area that contains their individual copies of the channel. Each subscriber can have different programs recorded on different RS-DVR systems 162—each individual recording is on only one server. On playback, the subscriber system 120 requests video from the appropriate RS-DVR system 162 and specifies which individual subscriber is requesting it (so that the RS-DVR system 162 can find the correct video copy). The video is returned to the requesting subscriber system 120 from the specialized web server, for example, using HTTP video objects marked as being non-cacheable to ensure that the personalized video copy is only delivered to the requesting subscriber system.

In accordance with certain exemplary embodiments, as soon as the video is encoded and sent to the RS-DVR system 162, it is immediately separated into per subscriber copies by being written multiple times into separate files in the file system. From then on the video remains separate and is only accessible by the individual subscriber that requested the recording. That said, as described above, for live streaming, the RS-DVR system 162 may instead utilize a temporary copy of a recent portion of the live multimedia content 101 for immediate streaming to multiple users.

As mentioned above, the RS-DVR manager 160 can be utilized to support a "cluster group" of RS-DVR systems 162. In practice, there can be multiple cluster groups with each having one or more RS-DVR systems 162. Depending on the particular system requirements, a cluster group may include up to hundreds of RS-DVR systems 162. A cluster group is used to provide scalability and creates certain types of failure resiliency.

Each cluster group may be configured to record a set of channels. At the time the subscriber is provisioned with their channel lineup, each subscriber is assigned to a cluster group for each channel that can be recorded on their behalf. In such embodiments, the RS-DVR manager 160 may assign requests for live streaming multimedia content 101 associated with a particular channel to a particular RS-DVR system 162 that is already configured to record that channel.

In accordance with one implementation, the RS-DVR systems 162 are deployed by MSOs close to the edge of their network, at roughly the same location where HTTP caching is provided. The RS-DVR systems 162 would be deployed at that location because the recoded content delivered by the RS-DVR systems 162 may be required to be "non-cacheable" and video delivery typically works better if the content comes from a system that is "close" to the subscriber.

An important consideration in planning on where to deploy RS-DVR cluster groups is the cost of the backhaul bandwidth. Every channel being recorded by the cluster group requires backhaul bandwidth for all of the bitrates, which suggests that the RS-DVR cluster groups should be centralized. However, with the streams being delivered to the subscriber from the RS-DVR systems 162 being marked as non-cacheable, depending on how many subscribers there are at peak load times it could be better to locate the RS-DVR cluster groups closer to the subscriber, to avoid using backhaul bandwidth for subscriber playback. It is therefore recommended that the RS-DVR systems 162 be deployed both centrally and at the edge with the centralized RS-DVR systems 162 being utilized for content where the amount of bandwidth required for actual playback will be less than the bandwidth required to send the multiple copies down to the edge RS-DVR systems 162. The RS-DVR manager 160 can use actual playback analytics in deciding where to assign particular recordings as well as where to assign live streaming requests, as described above.

Dynamic Delivery Route Adjustments During Live Streaming

Figure 13:
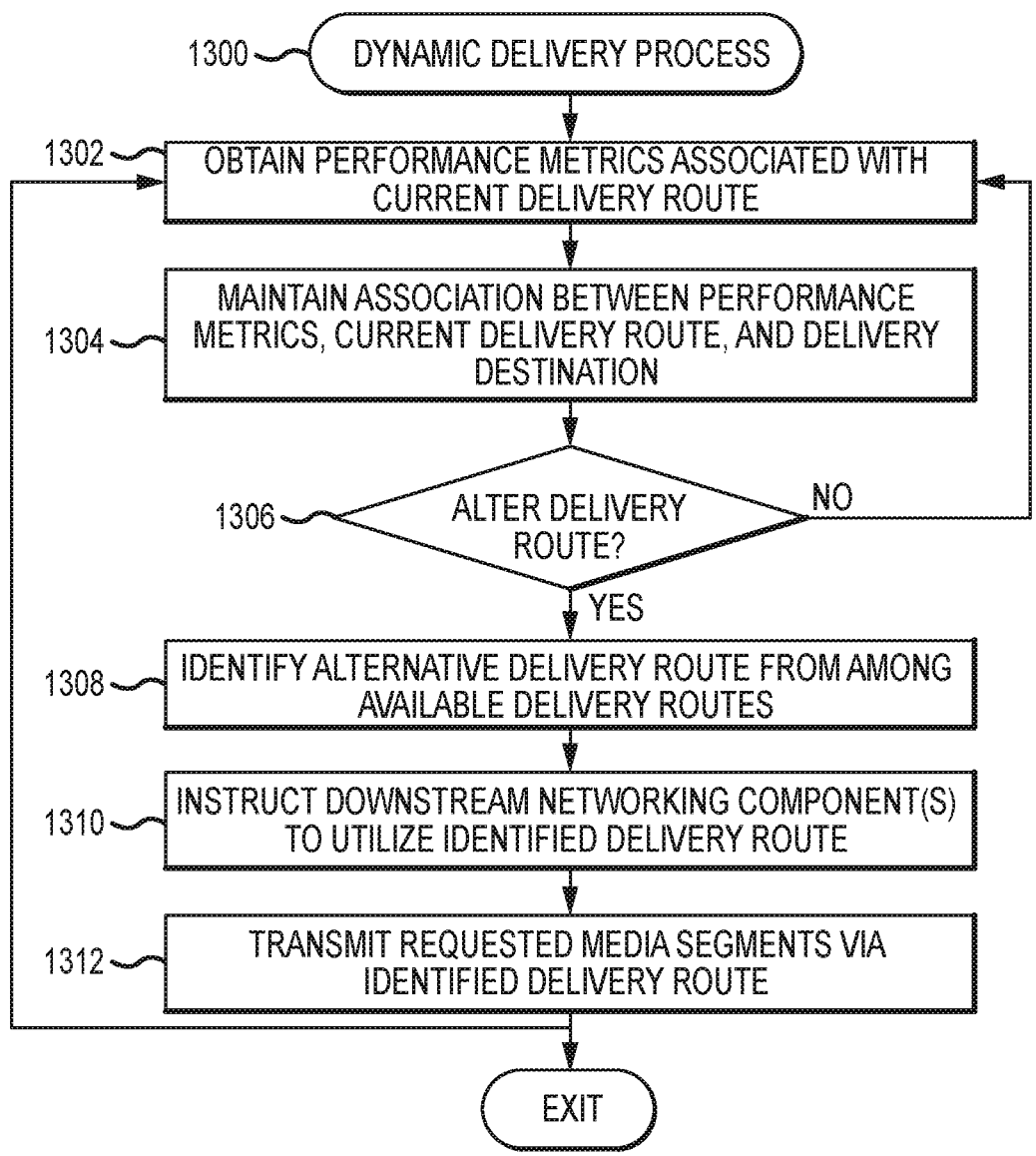
FIG. 13 is a flowchart of an exemplary dynamic delivery process suitable for implementation by a content delivery source in accordance with one or more embodiments.

FIG. 13 depicts an exemplary embodiment of a dynamic delivery process 1300 suitable for implementation in a multimedia streaming system. The dynamic delivery process 1300 may be implemented with the multimedia streaming system 100 independently or in concert with any one of the processes 700, 800, 1000 described above. For purposes of explanation, the dynamic delivery process 1300 may be described herein in the context of delivering content using an RS-DVR system, however, the dynamic delivery process 1300 is not necessarily limited to any particular content delivery source, and may be implemented in an equivalent manner when streaming content from the origin content server 102 (e.g., origin delivery process 800) or another content delivery source. That said, when the encoded media segments being delivered are non-cacheable, the delivery route (or path) on the network 110 used for transmitting the segments may have a disproportionate impact on the streaming performance relative to cacheable segments. Moreover, because the RS-DVR system servicing a media player may not be located in close proximity to the media player (e.g., as compared to a CDN edge server), the streaming bandwidth may be largely dependent on the end-to-end delivery route (or path) on the network 110 between the RS-DVR system (i.e., the origin) and the requesting media player (i.e., the destination).

The various tasks performed in connection with the illustrated process 1300 may be implemented using hardware, firmware, software executed by processing circuitry, or any combination thereof. For illustrative purposes, the following description may refer to elements mentioned above in connection with FIGS. 1-2. In practice, portions of the dynamic delivery process 1300 may be performed by different elements of a multimedia streaming system 100. That said, for purposes of explanation, the dynamic delivery process 1300 is described here primarily in the context of an RS-DVR system 162 in an RS-DVR network 106. It should be appreciated that the dynamic delivery process 1300 may include any number of additional or alternative tasks, the tasks need not be performed in the illustrated order and/or the tasks may be performed concurrently, and/or the dynamic delivery process 1300 may be incorporated into a more comprehensive procedure or process having additional functionality not described in detail herein. Moreover, one or more of the tasks shown and described in the context of FIG. 13 could be omitted from a practical embodiment of the dynamic delivery process 1300 as long as the intended overall functionality remains intact.

In exemplary embodiments, the dynamic delivery process 1300 obtains one or more performance metrics associated with the delivery route on the network currently being used for delivering streaming multimedia content (task 1302). The performance metrics may include the download bandwidth, data rate, or throughput at the destination, a rate or amount of dropped or lost packets, the streaming bitrate at the destination, and the like. Depending on the embodiment, the content delivery source may calculate, estimate, or otherwise determine the performance metrics based on the transmitted media segments and the requests received from the destination client device 120 and/or destination media player 122, or alternatively, the content delivery source may receive the download performance metrics from the destination client device 120 and/or destination media player 122. In exemplary embodiments, the initial delivery route utilized to deliver requested media segments transmitted by the content delivery source is chosen based on a backbone routing table and the respective geographic or network locations of the content delivery source and the destination client device. In other words, the initial delivery route may be the default delivery route dictated by the routing table given the respective locations of the content delivery source and the destination client device. In such a case, the content delivery source does not need to take any particular action to facilitate use of that delivery route.

In the illustrated embodiment, the dynamic delivery process 1300 stores or otherwise maintains those performance metrics in association with the delivery route and the destination for the streaming content (task 1304). In this regard, the content delivery source may maintain a table, list, or the like for monitoring or otherwise tracking the streaming performance associated with a particular destination device or media player and a particular delivery route to that destination. The performance data may be utilized by the content delivery source when selecting an alternative delivery route, as described in greater detail below.

The dynamic delivery process 1300 monitors the streaming performance metrics and identifies or otherwise determines whether to alter the delivery route based on one or more of the performance metrics (task 1306). In exemplary embodiments, the content delivery source compares the performance metrics to one or more applicable thresholds to identify when the performance of the current delivery route fails to meet the desired level of performance. For example, as traffic or other conditions on the network 110 change, the performance of the default delivery route dictated by the routing table may deteriorate, which may be further exacerbated when a RS-DVR system 162 is providing content that cannot be cached within the network 110. In this regard, the content delivery source may autonomously determine that the delivery route should be changed based on real-time performance of the current delivery route. For example, a RS-DVR system 162 may determine a different delivery route should be utilized when the bandwidth associated with streaming over the current delivery route is less than a bandwidth necessary to support streaming the multimedia content 101 at the lowest available bitrate. As another example, the RS-DVR system 162 may determine a different delivery route should be utilized when a number or rate of lost packets is greater than a threshold value. Alternatively, a media player 122 may compare the performance metrics to one or more applicable thresholds to identify when the performance of the current delivery route fails to meet the desired level of performance. For example, the media player 122 may determine that the delivery route should be changed when the real-time performance of the current delivery route does not support a level of presentation quality (or bitrate) desired by a user of the client device 120. In this regard, the media player 122 may request the content delivery source utilize a different delivery route.

In response to determining the delivery route should be changed, the dynamic delivery process 1300 identifies or otherwise selects an alternative delivery route from among a plurality of available delivery routes (task 1308). In this regard, based on the routing table, the content delivery source may identify which alternative backbone delivery routes are available for transmitting data from the location of the content delivery source, and then apply various heuristics to select an alternative delivery route from among those potential delivery routes. For example, if the content delivery source maintains stored performance data associated with the current destination device for different delivery routes, the content delivery source may select a previously used delivery route with the best performance as the alternative delivery route from among the potential delivery routes. Additionally or alternatively, if the content delivery source maintains stored performance data associated with the different potential delivery routes for other destinations on the network 110 proximate the current destination client device 120, the content delivery source may analyze the performance of the various delivery routes with respect to similarly located destinations to identify the delivery route with the best performance for those similar destinations as the alternative delivery route from among the potential delivery routes. It should be noted that there are various different potential schemes for selecting a delivery route from among a group of available delivery routes, and the subject matter described herein is not limited to any particular selection scheme. Moreover, in some embodiments, the alternative delivery route may be selected arbitrarily or randomly.

After identifying an alternative delivery route, the dynamic delivery process 1300 instructs or otherwise commands one or more downstream networking component(s) to utilize the alternative delivery route and then transmits media segments to the requesting media player via that delivery route (tasks 1310, 1312). In this regard, because the content delivery source may not have physical capability to effectuate the alternative delivery route, the content delivery source instructs the nearest or adjacent routing component(s) to transmit media segments for delivery to the destination client device over the network 110 via the selected alternative delivery route. For example, the content delivery source may be connected to the network 110 via a router or other similar networking component, which, in turn, is connected to a plurality of backbone providers, such as, for example, one or more tier 1 networks, tier 2 networks, internet service providers, or the like. Thereafter, the downstream networking component(s) transmit media segments from the content delivery source to the destination client device 120 via the alternative delivery path (e.g., a different backbone provider network).

The dynamic delivery process 1300 may repeat throughout streaming multimedia content to a particular destination device to dynamically alter the delivery route used to transmit the streaming media based on the real-time performance of the current delivery route. In this regard, when an alternative delivery route initially identified by the content delivery source (e.g., task 1308) fails to achieve the desired performance objectives (e.g., task 1306), the content delivery source may select another alternative delivery route different from the preceding delivery route(s), for example, by excluding the preceding delivery route(s) from the potential available delivery routes before providing source-side delivery route selection heuristics (task 1308). Thereafter, the content delivery source instructs the downstream networking component(s) to utilize the newly identified delivery route for subsequent transmissions to the destination client device 120. In exemplary embodiments, exclusion of preceding delivery route(s) from the potential available delivery routes is limited to a particular duration of time, so that the content delivery source may eventually revert to using a preceding delivery route in the future as conditions on the network 110 change to where that delivery route may perform better than other available delivery routes.

Figure 14:
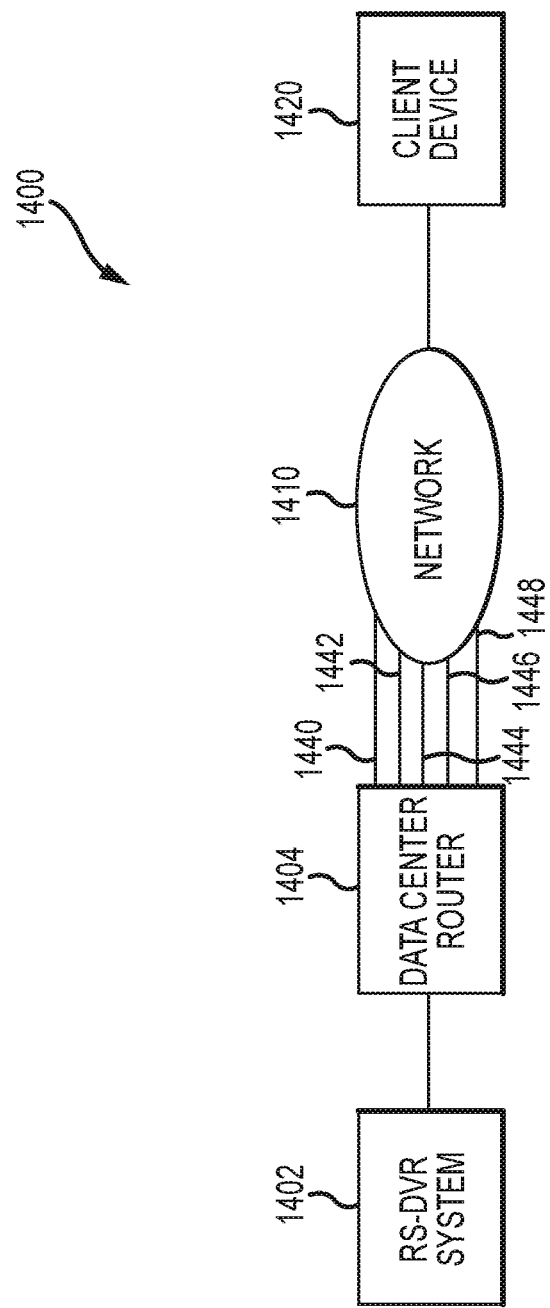
FIG. 14 is a schematic representation of an exemplary deployment of a content delivery source with a downstream networking component suitable for implementing the dynamic delivery process of FIG. 13 in accordance with one or more embodiments.

FIG. 14 depicts a block diagram of an exemplary deployment of a content delivery source 1402 and a downstream networking component 1404 suitable for implementing the dynamic delivery process 1300 of FIG. 13. In one or more exemplary embodiments, the content delivery source 1402 is realized as an RS-DVR system (e.g., RS-DVR system 162) physically collocated with the networking component 1404 at a particular geographic location, such as a data center 1400. In this regard, the networking component 1404 may be realized as a router associated with the data center 1400 that communicatively connects devices at the data center 1400 behind the router 1404 to a network 1410 (e.g., network 110), such as the Internet, via a plurality of different potential routes or paths 1440, 1442, 1444, 1446, 1448. In this regard, each of the potential routes 1440, 1442, 1444, 1446, 1448 may be associated with a particular backbone provider network, which, in turn, is integrated with other networks to effectively provide the network 1410 over which devices at the data center 1400 can communicate with a client device 1420 (e.g., client device 120).

Referring to FIG. 14 with reference to FIGS. 1 and 13, in response to initial requests for media segments from a media player 122 on the client device 120, 1420, the RS-DVR system 162, 1402 may transmit or otherwise provide the requested media segments (or packetized representations thereof) to the data center router 1404 without any affirmative selection of any particular delivery route 1440, 1442, 1444, 1446, 1448 that should provide the initial delivery path from the data center 1400 to the network 110, 1410 for transmitting those segments to the client device 120, 1420. Thus, the data center router 1404 may utilize a routing table (which may be stored or maintained by the data center router 1404 or alternatively received from a remote device via the network 1410) to select or otherwise identify an initial delivery route 1440 for transmitting the media segments from the RS-DVR system 162, 1402 to the client device 120, 1420. For example, based on the location of the client device 120, 1420 on the network 1410 relative to the location of the data center router 1404, the data center router 1404 may identify a default delivery route 1440 for transmitting data to the location of the client device 120, 1420.

During transmission, the RS-DVR system 162, 1402 may calculate, determine, or otherwise obtain one or more performance metric(s) associated with the initial delivery route 1440 on the network 110, 1410 and compare the current performance metric(s) to one or more thresholds or other criteria to identify whether to alter the delivery route (e.g., tasks 1302, 1304, 1306). For example, the RS-DVR system 162, 1402 may determine the download bitrate or throughput using the initial delivery route 1440 is insufficient for streaming the requested bitrate media segments, that the number or rate of dropped or lost packets is greater than a maximum allowable threshold value, or the like. In response to determining the delivery route should be changed, the RS-DVR system 162, 1402 may identify or otherwise select an alternative delivery route 1442 and then instruct or otherwise command the data center router 1404 to transmit media segments destined for the client device 120, 1420 via the alternative delivery route 1442. As described above, the selected alternative delivery route 1442 may be based on historical performance data associated with the alternative delivery route 1442 for the particular client device 120, 1420 and/or other client devices 120, 1420 similarly located on the network 110, 1410. For example, if a first backbone provider route 1442 has been previously used successfully by the RS-DVR system 162, 1402 to deliver content to the same client device 120, 1420 or other client devices 120, 1420 in the same general area on the network 110, 1410 (e.g., within the same IP address range, geographic zip code, and/or the like) while another potential backbone provider route 1444 has previously performed poorly for delivering content to the same client device 120, 1420 or other similarly located client devices 120, 1420, the RS-DVR system 162, 1402 may select that first backbone provider route 1442 as the first alternative delivery route to be tried for the current iteration of the dynamic delivery process 1300. Alternatively, the selected alternative delivery route 1442 may be randomly or arbitrarily selected from among the available alternative delivery routes 1442, 1444, 1446, 1448.

The RS-DVR system 162, 1402 instructs or otherwise commands the data center router 1404 to utilize the selected alternative delivery route 1442 for delivering media segments to the client device 120, 1420 instead of the initial delivery route 1440, thereby causing the data center router 1404 to override or otherwise overrule the default routing table. The RS-DVR system 162, 1402 continues monitoring performance metrics associated with the selected alternative delivery route 1442 in real-time, and when the performance metrics indicate the delivery route should be altered, the RS-DVR system 162, 1402 repeats the tasks of selecting another alternative delivery route from among the remaining available alternative delivery routes 1444, 1446, 1448. In this manner, the RS-DVR system 162, 1402 supporting the dynamic delivery process 1300 may progress through trying each potential delivery route 1440, 1442, 1444, 1446, 1448 as needed based on real-time streaming performance before reverting back to the initial default delivery route 1440 dictated by the routing table. Thus, if none of the potential delivery routes 1440, 1442, 1444, 1446, 1448 are capable of performing at the desired level, the dynamic delivery process 1300 effectively determines that the problems on the network 110, 1410 are essentially local to the client device 120, 1420 and reverts to the default routing.

It should be noted that although the subject matter described above in the context of FIG. 14 merely describes an implementation using one downstream networking component 1404, more robust implementations may support instructing multiple downstream components to achieve a more granular control of the path used to deliver content to a client. Additionally, while FIG. 14 is primarily described in the context of an RS-DVR system, the dynamic delivery process 1300 can be implemented in an equivalent manner for any content delivery source 102, 104, 106 within the multimedia streaming system 100. Furthermore, although the dynamic delivery process 1300 is described with reference to FIG. 14 primarily in the context of a source-side implementation, various aspects of the dynamic delivery process 1300 can be performed or otherwise supported by the client device 120, 1420. For example, the client device 120, 1420 may monitor real-time streaming performance, associate or otherwise correlate the performance with an initial delivery route 1440, and notify or otherwise instruct the RS-DVR system 162, 1402 and/or an upstream networking component 1404 to utilize an alternative delivery route 1442, 1444, 1446, 1448 when the real-time streaming performance of the initial delivery route 1440 falls below applicable thresholds or otherwise fails to satisfy desired streaming performance criteria.

Figure 15:
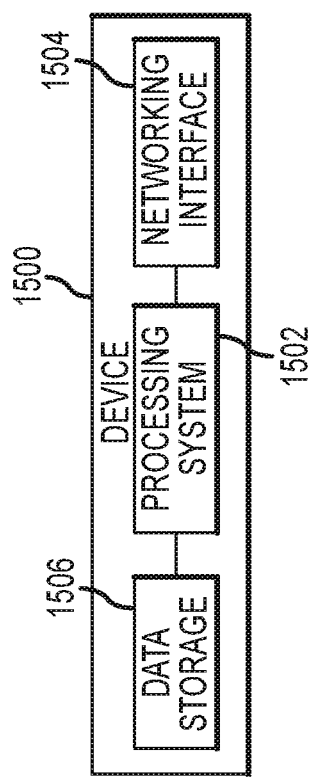
FIG. 15 is a block diagram of an electronic device suitable for use as a component of a multimedia streaming system in accordance with one or more embodiments.

FIG. 15 depicts an exemplary embodiment of an electronic device 1500 suitable for use as a content delivery source (or a component thereof) in a multimedia streaming system. For example, the device 1500 can be realized as a server or other computing device communicatively coupled to a network to receive requests for media segments from a client via the network, obtain the requested media segments (e.g., from local storage, a cache, or an origin server), and transmit the requested media segments to the client over the network. It should be appreciated FIG. 15 is a simplified representation of the electronic device 1500 for purposes of explanation and is not intended to limit the subject matter described herein in any way.

The illustrated device 1500 includes a processing system 1502 that is coupled to a network interface 1504 and a data storage element 1506. The processing system 1502 may be realized using any suitable processing system and/or devices, such as, for example, one or more processors, central processing units (CPUs), graphics processing units (GPUs), controllers, microprocessors, microcontrollers, processing cores and/or other computing resources configured to support the subject matter described herein. The network interface 1504 generally represents the component, hardware or the like of the device 1500 that facilitates communications with a network (e.g., network 110). The data storage element 1506 may be realized using any suitable non-transitory short or long term data storage or other non-transitory computer-readable media capable of storing programming instructions for execution by the processing system 1502. The stored programming instructions, when read and executed by the processing system 1502, cause processing system 1502 to support or otherwise perform one of more tasks, functions, operations, and/or processes described herein. The data storage element 1506 may also store or otherwise maintain data (e.g., performance metrics and the like) as needed to support the tasks, functions, operations, and/or processes described herein. In some embodiments, such as, for example, when the device 1500 functions as an edge server or other component of a CDN 104, the data storage element 1506 may also include one or more caches for storing media segments received from an origin server.

To briefly summarize, the subject matter described herein supports streaming multimedia by dynamically and intelligently adapting to real-time streaming performance or network conditions, for example, by changing content delivery sources, delivery routes over the network, transmission layer protocol parameters, and the like. Thus, the likelihood of a satisfactory user experience throughout presentation of the multimedia content is increased while also achieving a desired allocation of bandwidth on the network.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to broadcasting, multicasting, content delivery networks, encoding/decoding, live streaming, content formats, file structures, buffering, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of streaming media content corresponding to a live event over a network, the method comprising:
   detecting, by a media player at a client device coupled to the network, an adverse condition with respect to streaming the media content using a presentation buffer at the client device;
   in response to the adverse condition, transmitting, by the media player at the client device, one or more requests for an initial set of one or more encoded media segments corresponding to the live event at the time of the adverse condition to an origin content server on the network to temporarily obtain the media content directly from the origin content server;
   receiving, by the media player at the client device, the initial set of one or more encoded media segments from the origin content server; and
   thereafter:
   detecting, by the media player, a second condition with respect to streaming the media content; and
   in response to detecting the second condition:
   requesting, by the media player from a remote-storage digital video recorder (RS-DVR) system on the network, a subsequent set of one or more encoded media segments following the initial set of one or more encoded media segments received from the origin content server, wherein the RS-DVR system obtains the subsequent set of one or more encoded media segments from the origin content server, creates a shared access rights content file comprising the subsequent set of one or more encoded media segments in a temporary data storage at the RS-DVR system and transmits the subsequent portion from the shared access rights content file to the client device; and
   receiving, by the media player at the client device, the subsequent set of one or more encoded media segments from the RS-DVR system.

2. The method of claim 1, wherein detecting the adverse condition comprises detecting a startup condition for streaming the live event.

3. The method of claim 1, wherein detecting the adverse condition comprises identifying a channel change.

4. The method of claim 1, wherein detecting the adverse condition comprises detecting a low buffer condition with respect to the media content.

5. The method of claim 4, wherein detecting the second condition comprises detecting an amount of buffered content corresponding to the media content in the presentation buffer is greater than a threshold amount.

6. The method of claim 5, wherein detecting the low buffer condition comprises detecting the amount of buffered content corresponding to the media content in the presentation buffer is less than a second threshold amount.

7. The method of claim 1, wherein detecting the second condition comprises detecting a timeout condition with respect to requesting the media content from the origin content server.

8. The method of claim 1, further comprising:
   obtaining, by the media player, a prioritized list of the plurality of content delivery sources on the network, wherein the origin content server is ranked last on the prioritized list; and after detecting the second condition, selecting, by the media player, the RS-DVR system on the network based at least in part on the prioritized list.

9. The method of claim 1, wherein:
detecting the adverse condition comprises detecting when buffer underrun is likely based on current contents of the presentation buffer at the client device; and
detecting the second condition comprises detecting when an amount of the media content in the presentation buffer is greater than a threshold amount.

10. A non-transitory computer-readable medium having computer-executable instructions stored thereon that, when executed by a processing system of a client device coupled to a network, cause the processing system to:
detect an adverse condition with respect to streaming media content corresponding to a live event using a presentation buffer at the client device;
in response to detecting the adverse condition, directly request a first portion of the media content corresponding to the live event at the time of the adverse condition from an origin content server on the network to temporarily obtain the media content directly from the origin content server;
thereafter detect a second condition with respect to streaming the media content; and
in response to detecting the second condition, request a subsequent portion of the media content that follows the first portion of media content obtained from the origin content server from a remote-storage digital video recorder (RS-DVR) system on the network, wherein the RS-DVR system obtains the subsequent portion of the media content from the origin content server, creates a shared access rights content file comprising the subsequent portion of the media content in a temporary data storage at the RS-DVR system and transmits the subsequent portion from the shared access rights content file to the client device.

11. The computer-readable medium of claim 10, wherein the instructions cause the processing system to:
receive the first portion of the media content from the origin content server via the network;
store the first portion of the media content in the presentation buffer on the client device; and
detect the second condition when an amount of the media content in the presentation buffer exceeds a threshold.

12. The computer-readable medium of claim 10, wherein the instructions cause the processing system to:
obtain a prioritized list of a plurality of content delivery sources on the network from a device on the network; and
select the RS-DVR system of the plurality of content delivery sources based at least in part on the prioritized list, wherein the origin content server is ranked lowest on the prioritized list.

13. The computer-readable medium of claim 10, wherein the RS-DVR system transmits the subsequent portion of the media content to the client device using a modified transport layer protocol.

14. The computer-readable medium of claim 10, wherein the RS-DVR system marks the subsequent portion of the media content being transmitted as cacheable.

15. A method of streaming media content corresponding to a live event over a network, the method comprising:
receiving, at an origin content server, a request for a portion of the media content corresponding to the live event at the time of an adverse condition from a media player on a client device via the network, the media player requesting the portion of the media content directly from the origin content server in response to the adverse condition with respect to streaming the media content using a presentation buffer at the client device;
identifying, by the origin content server, the request as originating from the media player on the client device;
in response to identifying the request as originating from the media player, temporarily transmitting, by the origin content server to the client device, the requested portion of the media content to the media player on the client device via the network using a modified transport layer protocol;
after transmitting the requested portion, receiving, at the origin content server, a second request for a subsequent portion of the media content that follows the requested portion of media content via the network from remote-storage digital video recorder (RS-DVR) system on the network; and
transmitting the subsequent portion of the media content to the RS-DVR system using an unmodified transport layer protocol, wherein the RS-DVR system creates a shared access rights content file comprising the subsequent portion of the media content in a temporary data storage at the RS-DVR system and transmits the subsequent portion of the media content to the client device in response to the RS-DVR system receiving a third request for the subsequent portion of the media content via the network from the media player on the client device.

16. The method of claim 15, further comprising:
after transmitting the requested portion, receiving, at the origin content server, one or more requests for the subsequent portion of the media content via the network from the media player on the client device; and
disregarding the one or more requests when a timeout period associated with requests from the media player on the client device has been met or exceeded.

17. The method of claim 15, further comprising:
receiving, by the origin content server, signals representative of the media content;
converting, by the origin content server, the signals into the portion of the media content; and
storing the portion of the media content in a cache of the origin content server.

18. The method of claim 17, wherein the origin content server leverages an Hypertext Transfer Protocol (HTTP) accelerator to distribute the requested portion using the modified transport layer protocol by modifying a Transport Control Protocol (TCP) stack.

19. The method of claim 15, wherein transmitting the requested portion using the modified transport layer protocol comprises the origin content server increasing a Transport Control Protocol (TCP) receive window size.

* * * * *